United States Patent
Nguyen et al.

(10) Patent No.: US 11,172,508 B2
(45) Date of Patent: Nov. 9, 2021

(54) METHODS TO AVOID TRANSMISSION COLLISIONS FOR NR V2X AND LTE V2X WITHIN THE SAME DEVICE

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 16/669,344

(22) Filed: Oct. 30, 2019

(65) Prior Publication Data
US 2020/0146066 A1 May 7, 2020

Related U.S. Application Data

(60) Provisional application No. 62/754,562, filed on Nov. 1, 2018.

(51) Int. Cl.
*H04W 74/08* (2009.01)
*H04W 36/00* (2009.01)
(Continued)

(52) U.S. Cl.
CPC ......... *H04W 74/0816* (2013.01); *H04W 4/40* (2018.02); *H04W 28/26* (2013.01); *H04W 72/12* (2013.01); *H04W 88/06* (2013.01)

(58) Field of Classification Search
CPC ... H04W 74/0816; H04W 72/12; H04W 4/40; H04W 28/26; H04W 88/06; H04W 36/03;
(Continued)

(56) References Cited

U.S. PATENT DOCUMENTS

| 2016/0255639 | A1 | 9/2016 | Chen et al. |
| 2017/0280330 | A1* | 9/2017 | Martin .............. H04W 72/1215 |
| 2020/0314819 | A1* | 10/2020 | Loehr ................. H04W 72/042 |

OTHER PUBLICATIONS

Intel Corporation, Coexistence Mechanism for eV2X services, Oct. 2018, R1-1810781, 10 pgs.*
(Continued)

*Primary Examiner* — Joseph E Dean, Jr.
(74) *Attorney, Agent, or Firm* — Procopio, Cory, Hargreaves & Savitch LLP

(57) ABSTRACT

To improve the performance of a user equipment (UE) with V2X capability using two radio access technologies (RATs), such as NR V2X and LTE V2X capabilities, a method is disclosed for the UE having a first and a second RAT component to allocate or adjust resources for V2X transmission using the first RAT and/or V2X transmission using the second RAT to avoid or reduce potential collisions. The second RAT component may receive from the first RAT component information on first resources for V2X transmission using the first RAT. The second RAT component may determine if there is a potential collision between the first resources for V2X transmission using the first RAT and second resources for V2X transmission using the second RAT. The second RAT component may change the second resources if there is a potential collision. The first and second RAT components may transmit their respective V2X transmissions to UEs.

29 Claims, 15 Drawing Sheets

(51) Int. Cl.
*H04L 5/00* (2006.01)
*H04W 72/12* (2009.01)
*H04W 4/40* (2018.01)
*H04W 28/26* (2009.01)
*H04W 88/06* (2009.01)

(58) Field of Classification Search
CPC . H04W 36/14; H04W 72/1215; H04W 72/08; H04W 72/02; H04W 16/14; H04L 5/0042; H04L 5/0062; H04L 5/0091
See application file for complete search history.

(56) References Cited

OTHER PUBLICATIONS

Intel Corporation: "Coexistence Mechanisms for eV2X Services," 3GPP Draft, 3GPP TSG RAN WG1 Meeting #94bis, R1-1810781, Intel—eV2X COEX, 3rd Generation Partnership Project (3GPP), Mobile Competence Centre, 650, Route Des Lucioles, F-06921, vol. RAN WG1, No. Chengdu, China; Oct. 8, 2018-Oct. 12, 2018, Sep. 29, 2018 (Sep. 29, 2018), XP051518186, 10 pages, Retrieved from the Internet: URL: http://www.3gpp.org/ftp/tsg%5Fran/WG1%5FRL1/TSGR1%5F94b/Docs/R1%2D1810781%2Ezip [retrieved on Sep. 29, 2018] chapters 2, 4.2-4.4 and 5, figure 2.
International Search Report and Written Opinion—PCT/US2019/059223—ISA/EPO—dated Feb. 24, 2020.

* cited by examiner

METHODS TO AVOID TRANSMISSION COLLISIONS FOR NR V2X AND LTE V2X WITHIN THE SAME DEVICE

CROSS-REFERENCE TO RELATED APPLICATION

This application claims the benefit of U.S. Provisional Application Ser. No. 62/754,562, entitled "METHODS TO AVOID TRANSMISSION COLLISIONS FOR NR V2X AND LTE V2X WITHIN THE SAME DEVICE" and filed on Nov. 1, 2018, which is expressly incorporated by reference herein in its entirety.

BACKGROUND

Technical Field

The present disclosure relates generally to communication systems, and more particularly, to wireless communication using two radio access technologies within the same device.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in 5G NR, V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may have a first radio access technology (RAT) component and a second RAT component. The apparatus may be a user equipment (UE). The second RAT component may receive from the first RAT component information on first resources for a first transmission using the first RAT. The second RAT component may determine if there is a potential collision between the first resources for the first transmission using the first RAT and second resources for a second transmission using the second RAT. The second RAT component may adjust the second transmission or change the second resources if there is a potential collision. The second RAT component may transmit the second transmission to a second UE. The first RAT component may transmit the first transmission to a third UE.

In an aspect, of the disclosure, an apparatus that communicates using a first RAT may schedule first resources for first transmission by a UE using the first RAT. The apparatus may be a base station. The apparatus may receive from the UE information on second resources reserved for a second transmission from the UE using a second RAT. The apparatus may determine the first resources for the first transmission using the first RAT to avoid the second resources reserved for the second transmission using the second RAT. The apparatus may transmit information about the first resources to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
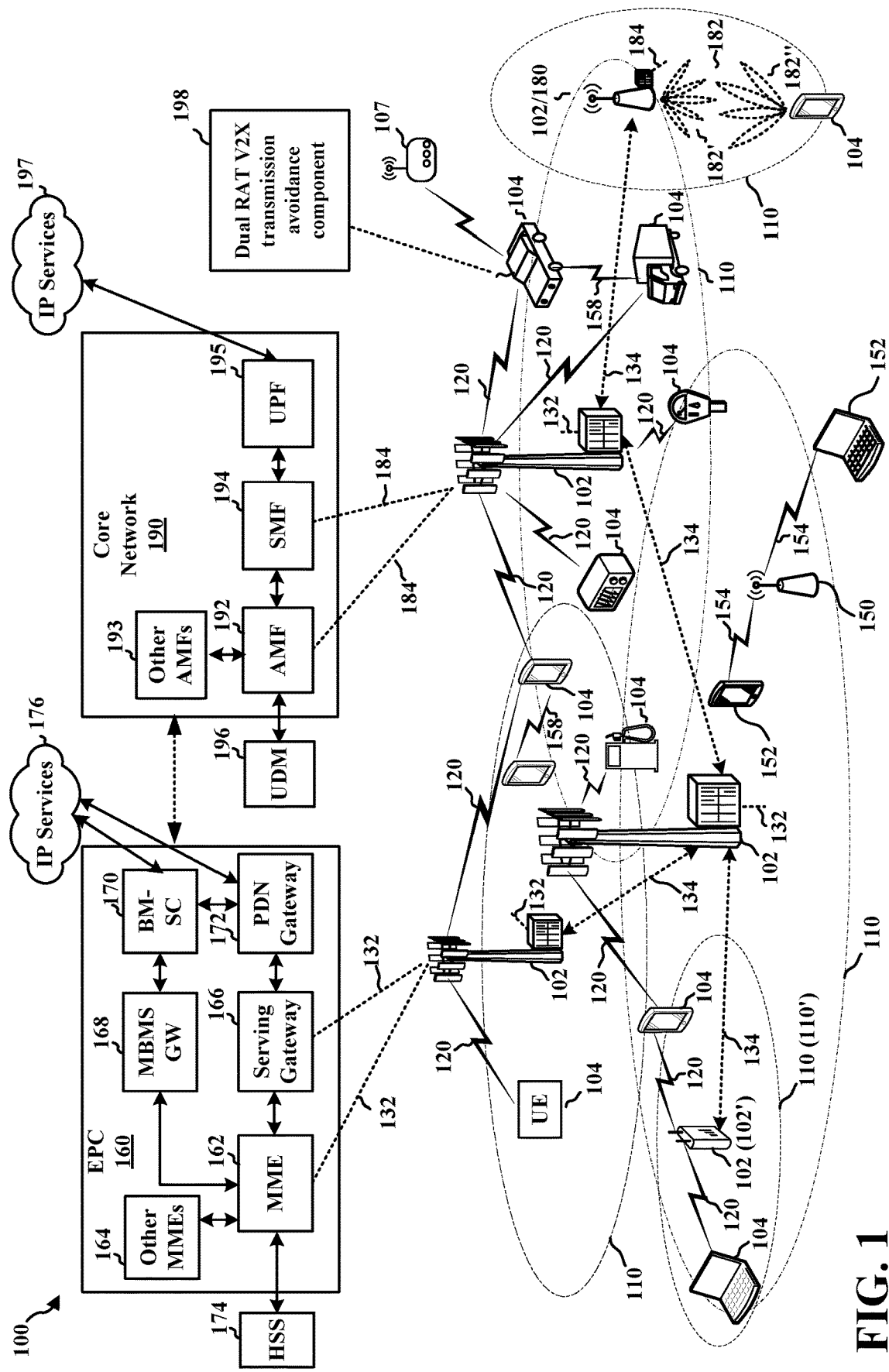
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The base station 180, e.g., a mmW base station, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 15. Although the following description may provide examples for V2X/D2D communication in connection with LTE and 5G NR, the concepts described herein may be applicable to other similar areas, such as LTE-A, CDMA, GSM, and other wireless technologies.

5G NR technology is expected to facilitate autonomous vehicles by enabling communication between vehicles (V2V), as well as other types of vehicle communication such as vehicle to network (V2N), vehicle to infrastructure (V2I), vehicle to pedestrian (V2P), etc., all of which may broadly be categorized as vehicle to everything (V2X) communication. An apparatus such as the UE 104 may perform V2X communication with a device using NR technology and may perform V2X communication with another device using LTE technology. When NR V2X capability coexists with LTE V2X capability within the same UE, collisions between V2X transmission using NR and LTE technologies may occur. Collisions between NR V2X transmission and LTE V2X transmission may degrade performance such as reducing communication throughput, range, or both.

Referring again to FIG. 1, in certain aspects, an apparatus such as the UE 104 or the base station 180 may be configured to avoid or minimize collisions between NR V2X transmission and LTE V2X transmission. The apparatus may comprise a dual radio access technology (RAT) V2X transmissions avoidance component 198 in the UE 104 or the base station 180 that may be configured to receive information on resources reserved for a first RAT and to allocate resources for a second RAT to avoid collisions in transmission between the first RAT and the second RAT. In one example, the first RAT may be LTE and the second RAT may be NR. In this example, the dual RAT V2X transmissions avoidance component 198 may receive information on resources reserved for LTE V2X transmission. The dual RAT V2X transmissions avoidance component 198 may allocate or adjust resources for NR V2X transmission based on the resources reserved for the LTE V2X transmission to avoid collisions between the NR V2X transmission and the LTE V2X transmission. In one aspect, the LTE V2X transmission may be given higher priority over the NR V2X transmission. In one aspect, in an autonomous mode, the UE 104 may allocate the resources for NR V2X transmission and LTE V2X transmission to avoid collision without assistance from a base station. In one aspect, a base station such as base station 180 for a first RAT may receive information on resources reserved for V2X transmission using the second RAT from the UE 104 and may allocate or adjust resources for V2X transmission using the first RAT by the UE 104 to avoid collisions. The base station may transmit the information on the resources allocated for the V2X transmission using the first RAT to the UE 104. Although examples are described in connection with V2X communication, aspects may also be applied to V2V or other D2D communication.

Figure 2:
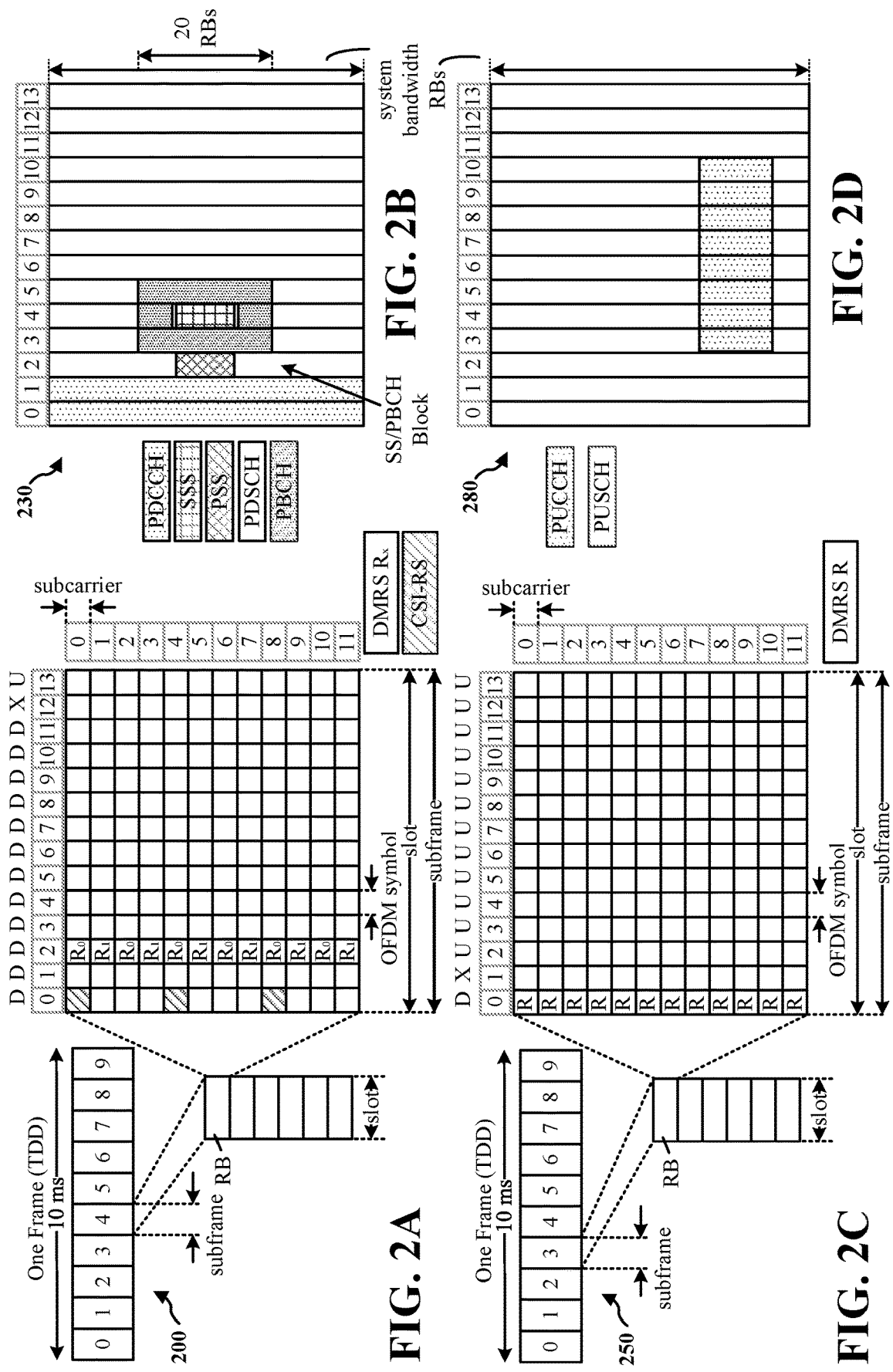
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 15:
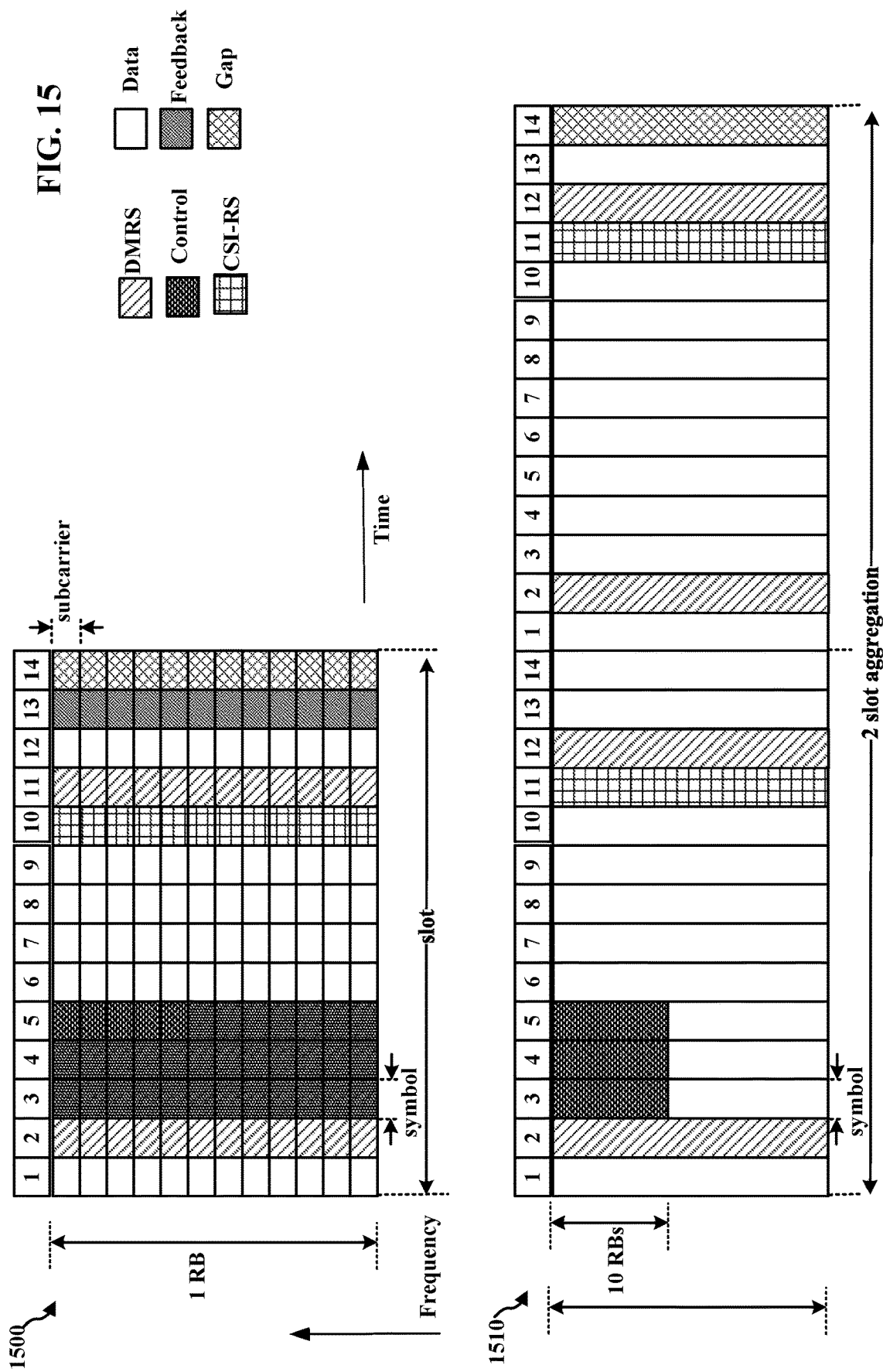
FIG. 15 is a diagram 1500 illustrating an example of a slot structure that may be used for sidelink communication in accordance with certain aspects of the disclosure.

FIG. 15 illustrates example diagrams 1500 and 1510 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 1500 illustrates a single slot transmission, e.g., which may correspond to a 0.5 ms transmission time interval (TTI). Diagram 1510 illustrates an example two-slot aggregation, e.g., an aggregation of two 0.5 ms TTIs. Diagram 1500 illustrates a single RB, whereas diagram 1510 illustrates N RBs. In diagram 1510, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 15, some of the REs may comprise control information, e.g., along with demodulation RS (DMRS). FIG. 15 also illustrates that symbol(s) may comprise CSI-RS. The symbols in FIG. 15 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 15. Multiple slots may be aggregated together. FIG. 15 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
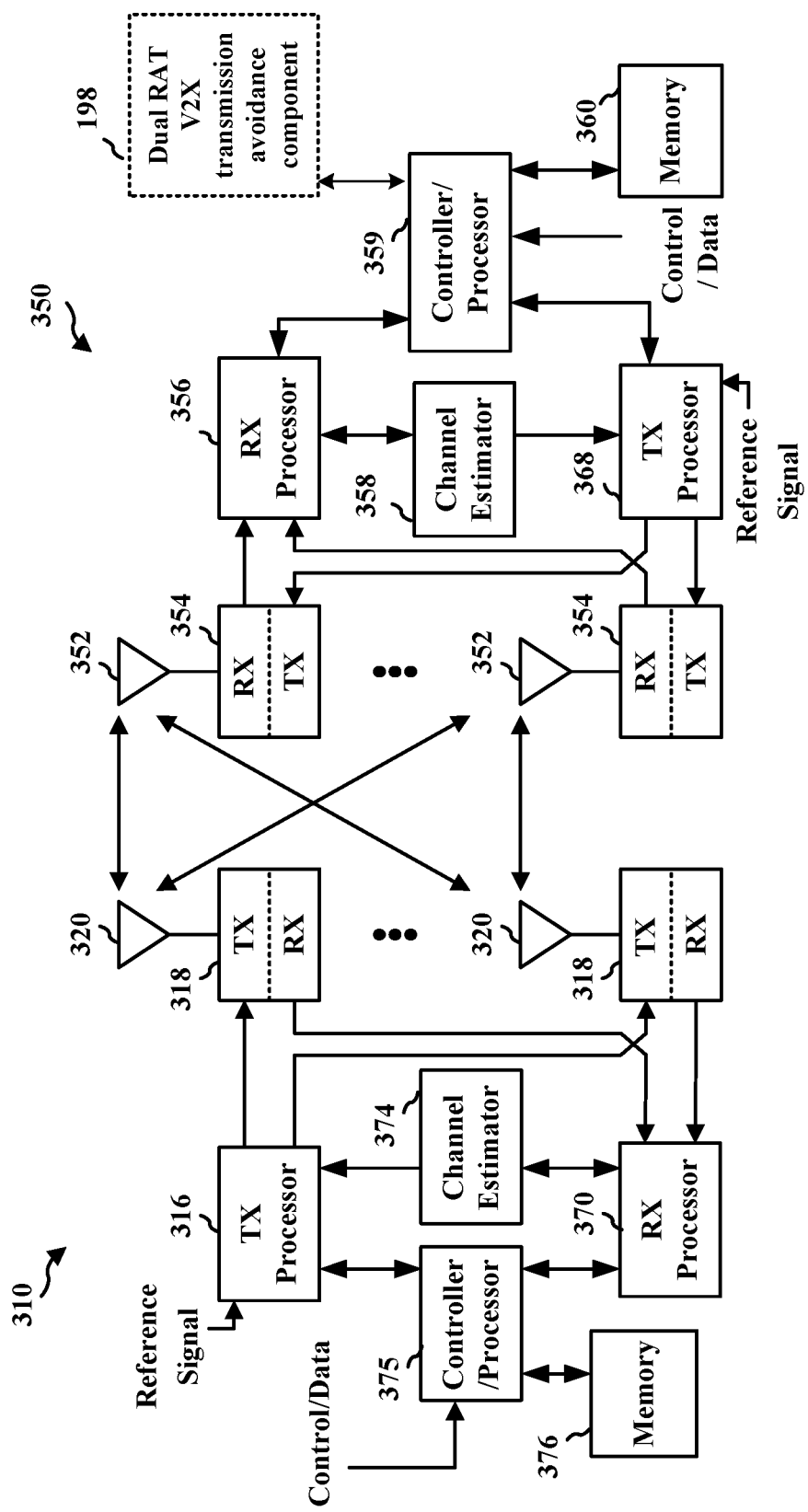
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

A UE may have capability for V2X communication based on multiple RATs. For example, a UE may be capable of communication based on NR V2X and based on LTE V2X.

As an example, when a UE has NR V2X capability along with LTE V2X capability, collisions may occur between V2X transmissions based on NR and LTE technologies. Such collisions between V2X transmissions for different RATs, e.g., NR V2X transmissions and LTE V2X transmissions, may degrade performance of the UE such as reducing communication throughput and/or range. For example, the two V2X transmission components may share the same RF chain. Even if the two V2X transmission components for the different RATs operate in different frequency channels, sharing the same power amplifier of the RF chain may introduce inter-modulation product and power back-off issues between transmissions on the two frequency channels. In order to reduce the potential for inter-modulation between the two transmissions, a power back-off may be used. However, a power back-off reduces the range of the transmission. Power sharing between two colliding transmissions may also require reducing the transmission power of each transmission, which also reduces the communication range and/or the data throughput. To improve performance, the UE and/or a base station may allocate or adjust a transmission or transmission resources for a NR V2X transmission and/or a LTE V2X transmission to avoid or reduce potential collisions.

A UE that performs V2X communication may operate in an autonomous mode or may be assisted by a base station. In the autonomous mode, the UE may allocate resources for V2X transmissions without relying on a base station. In the base station-assisted mode, the base station may allocate resources for use by the UE for V2X transmissions. For example, in the LTE V2X autonomous mode (e.g., LTE mode 4), the UE may allocate resources for LTE V2X transmissions. In the LTE V2X base station-assisted mode (e.g., LTE mode 3), an LTE base station such as an eNB may allocate resources for LTE V2X transmissions by the UE. Similarly, in the NR V2X autonomous mode (e.g., NR mode 2), the UE may allocate resources for NR V2X transmissions. In the NR V2X base station-assisted mode (e.g., NR mode 1), an NR base station such as a gNB may allocate resources for NR V2X transmissions by the UE. The LTE/NR operating modes for the UE may be independently chosen. As such, a UE may perform LTE V2X transmissions and NR V2X transmissions under four possible combinations of modes. For ease of discussion, the part of the UE that performs the LTE V2X transmissions may be referred to as the LTE component and the part of the UE that performs the NR V2X transmissions may be referred to as the NR component.

Figure 4:
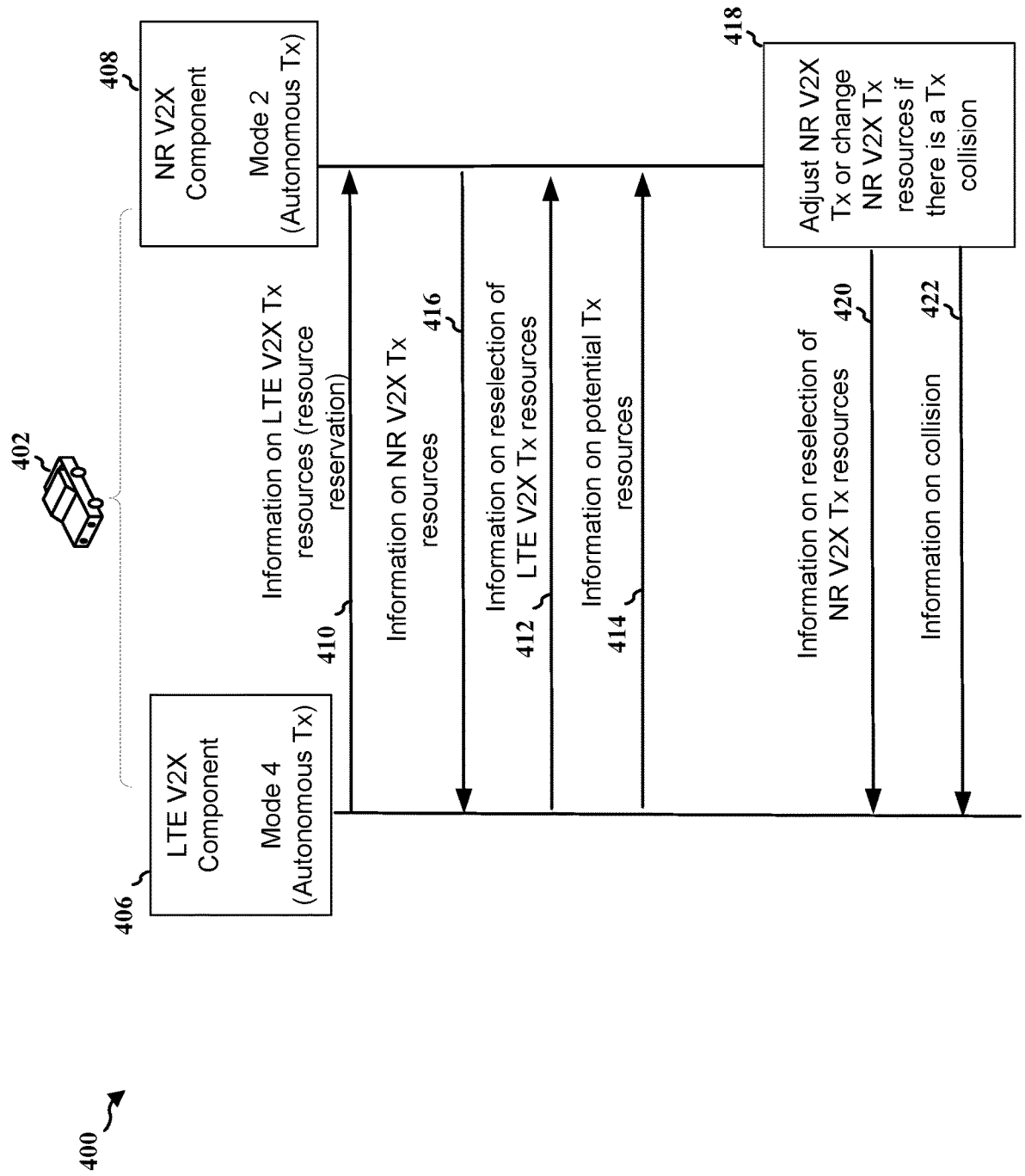
FIG. 4 is a call flow diagram illustrating an implementation of a NR component of a UE operating in the NR V2X autonomous transmit (Tx) mode exchanging information on transmission resources with a LTE component of the same UE operating in the LTE V2X autonomous transmission mode in accordance with certain aspects of the disclosure.

FIG. 4 is a call flow diagram 400 illustrating an implementation of a NR component 408 of a UE 402 operating in the NR V2X autonomous mode (e.g., NR mode 2) exchanging information on transmission resources with a LTE component 406 of the same UE operating in the LTE V2X autonomous mode (e.g., LTE mode 4) in accordance with certain aspects of the disclosure. Although the example aspects are described in connection with LTE V2X communication and NR V2X communication, aspects may also be applied to V2X, V2V or D2D communication based on a first RAT and a second RAT.

The LTE component 406 operating in the LTE V2X autonomous mode may schedule transmission resources for LTE V2X communication at 406. The resources may be in time and/or frequency. In one aspect, the LTE component may schedule resources for V2X transmission in a special pattern. For example, the LTE component may reserve semi-persistent scheduling (SPS) resources for LTE V2X communication. The LTE component may reserve the SPS resources for LTE V2X transmission until the SPS resources are adjusted due to a resource reselection procedure. In one aspect, the resources may be periodic. For example, one subframe may be reserved for LTE V2X transmission for every N subframes, where N is the period in subframes of the SPS resources. In one aspect, the LTE component may schedule one or more resources on a one-time only basis (e.g., one-shot resource). The LTE component may communicate information on the scheduled resources for LTE V2X transmission to the NR component at 410. In one aspect, the LTE component may communicate with the NR component using inter-stacks communication by transferring information from a LTE V2X stack to a NR V2X stack.

The NR component 408 operating in the NR V2X autonomous mode may schedule transmission resources for NR V2X communication. The resources may be reserved as one-shot resources or as SPS resources for NR V2X transmission. Due to backward compatibility reasons, and because LTE V2X may service basic safety applications, if there is a collision in the scheduled resources for the LTE V2X transmission and NR V2X transmission, priority may be given to the LTE V2X transmission. Thus, the NR component may use the information, e.g., 410 to schedule or adjust NR V2X transmission resources to avoid using the LTE V2X transmission resources at 418. For example, if there are periodic collisions between the resources for the NR V2X transmission and the resources for the LTE V2X transmission, the NR component may reselect the NR V2X resources. The NR component 408 may also schedule or adjust NR V2X transmission resources to avoid using LTE V2X transmission resources based on information 412 and 414 received from the LTE component 406, discussed infra.

In another aspect, for a class of traffic in NR V2X that has very high priority, tight delay requirement, or both, priority may be given to the NR V2X transmission. As one example, high priority resources for NR V2X that collide with LTE V2X resources may trigger a reselection of resources at the LTE V2X component 406. Accordingly, in one aspect, the NR component 408 may communicate information on the high priority resources for NR V2X transmission to the LTE component at 416 so the LTE component may reselect resources. Alternatively, if the NR component reselects resources due to a collision (at 418), the NR component may communicate information on reselected resources for NR V2X transmission to the LTE component at 420. In one aspect, the NR component may communicate with the LTE component by transferring information from the NR V2X stack to the LTE V2X stack.

The LTE component 406 may receive information on the high priority resources reserved for NR V2X transmission at 416 and, if there is a collision between the NR V2X transmission high priority resources and the scheduled LTE V2X transmission resources, may trigger reselection of the LTE V2X transmission resources. The LTE component may communicate information on the reselected resources for LTE V2X transmission to the NR component at 412. The NR component may use the information, e.g., 412 to schedule or adjust NR V2X transmission resources to avoid using the LTE V2X transmission resources at 418.

Due to the latency of communicating information from the LTE stack of the LTE component 406 to the NR stack of the NR component 408, there may be periods of time when the NR component does not have full knowledge of the scheduled LTE V2X transmission. For example, if the communication latency is x milliseconds and if the LTE component reschedules an earliest LTE V2X transmission to use a resource that is less than x milliseconds away, by the time the NR component receives the information on the rescheduled resources for LTE V2X transmission from the LTE component, the first LTE V2X transmission has already occurred. If there is an NR V2X transmission using the same resource, there may be a collision. In one aspect, when the NR component detects the collision, the NR component may terminate the NR V2X transmission to give priority to the LTE V2X transmission. In one aspect, the NR component may adjust the transmit power of the NR V2X transmission. In one aspect, the LTE component may adjust the transmit power of the LTE V2X transmission. In one aspect, the NR component may communicate information on potential or actual collisions to the LTE component at 422. The LTE component may change the scheduled resources for LTE V2X transmission if there are potential collisions or may implement measures to mitigate performance loss if there are actual collisions.

To minimize the potential for collisions, the LTE component 406 may communicate to the NR component 408 information on potential resources that may be selected by the LTE component for LTE V2X transmission at 414. The NR component may avoid using these potential resources for NR V2X transmission. Therefore, even though the NR component may not know whether one or more of the potential resources have actually been selected for LTE V2X transmission, the NR component may reduce the potential for collisions by refraining from using the potential resources for NR V2X transmission until other resources are exhausted.

Figure 5:
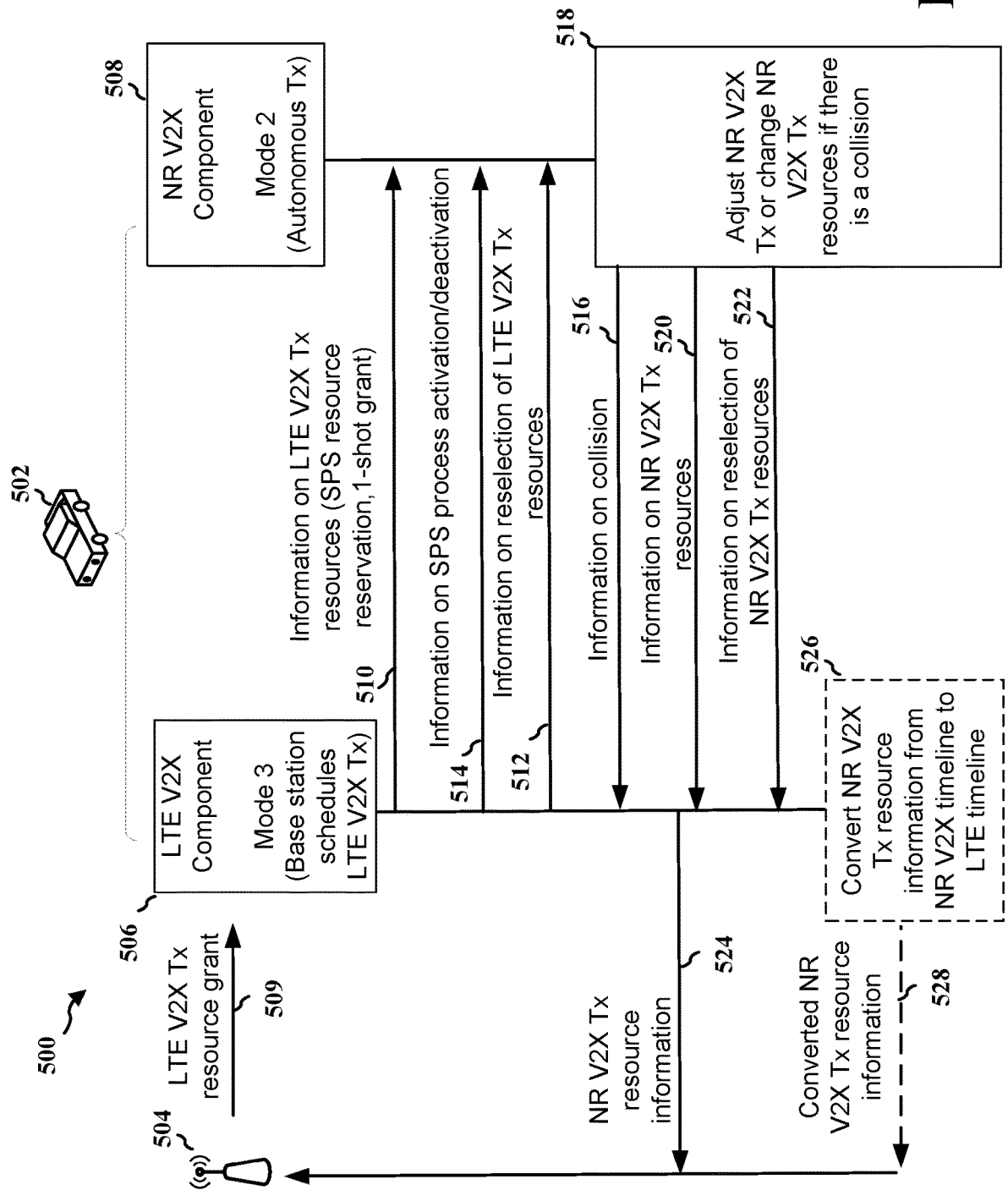
FIG. 5 is a call flow diagram illustrating an implementation of a NR component of a UE operating in the NR V2X autonomous transmission mode exchanging information on transmission resources with a LTE component of the same UE operating in the LTE V2X mode in which an LTE base station schedules LTE V2X transmission in accordance with certain aspects of the disclosure.

FIG. 5 is a call flow diagram 500 illustrating an implementation of a NR component 508 of a UE operating in the NR V2X autonomous mode (e.g., NR mode 2) exchanging information on transmission resources with a LTE component 506 of the same UE operating in the LTE V2X mode in which a first base station 504 schedules LTE V2X transmissions (e.g., LTE mode 3) in accordance with certain aspects of the disclosure. Although the example aspects are described in connection with LTE V2X communication and NR V2X communication, aspects may also be applied to V2V or D2D communication based on a first RAT and a second RAT.

A first base station 504 (such as an LTE base station, e.g., an eNB) may schedule transmission resources for LTE V2X communication using a first RAT. The resources may be SPS resources or dynamic resources that are allocated on a one-time basis. The first base station 504 may transmit a resource grant for the scheduled resources for LTE V2X transmission to the LTE component 506 of the UE at 509. In one aspect, the UE may be allocated SPS resources and the first base station 504 may transmit a control message to activate or deactivate the allocated SPS resources.

The LTE component 506 may communicate information on the LTE V2X transmission resources granted by the first base station 504 to the NR component 508 at 510. The LTE component may communicate information on SPS process configuration or information on dynamic resources allocated in a one-shot grant for LTE V2X transmission to the NR component. In one aspect, the LTE component may communicate information on activation/deactivation of the SPS processes for LTE V2X transmission to the NR component at 514.

In one aspect, the first base station 504 may reselect or adjust the LTE V2X transmission resources if there is a potential for collisions. For example, the first base station 504 may receive information on high priority resources reserved for NR V2X transmission, and if there are potential collisions (e.g., periodic collisions) between resources for the LTE V2X transmission and the high priority resources for the NR V2X transmission, the first base station 504 may select new resources for the LTE V2X transmission. The first base station 504 may transmit a new SPS process configuration for LTE V2X transmission or a new resource grant for the reselected resources to the UE. The UE may communicate information on the reselected resources for LTE V2X to the NR component at 512.

The NR component 508 operating in the NR V2X autonomous mode may schedule transmission resources for NR V2X communication at 508. The resources may be reserved as one-shot resources or as SPS resources for NR V2X transmission. The NR component may schedule or adjust NR V2X transmission resources to avoid collisions with the LTE V2X transmission resources at 518. For example, if there are periodic collisions between the one-shot resources for the NR V2X transmission and the SPS resources for the LTE V2X transmission, the NR component may reselect the one-shot resources for the NR V2X transmission. The NR component may communicate information on the one-shot resources for NR V2X transmission to the LTE component at 520. In one aspect, the NR component may communicate information on reselected one-shot resources for NR V2X transmission to the LTE component at 522. In one aspect, the NR component may communicate information on potential collisions between resources scheduled for NR V2X transmission and resources scheduled for LTE V2X transmission to the LTE component at 516. In one aspect, the NR component may detect actual collisions between NR V2X transmission and LTE V2X transmission and may communicate information on the actual collisions to the LTE component.

The LTE component 506 may forward the information on the resources for NR V2X transmission or information on potential or actual collisions to the first base station 504 at 524. Alternatively, the first base station 504 and the NR component 508 may operate on asynchronous timelines. As such, the information on the resources for NR V2X transmission may need to be converted from the NR V2X timeline to the timeline of the first base station 504. In one aspect, the first base station 504 may perform the conversion if it has knowledge of the NR V2X timeline. In one aspect, the LTE component may perform the conversion at 526. The LTE component may have knowledge of the NR V2X timeline and may convert the information on the resources for NR V2X transmission from the NR V2X timeline to the timeline of the first base station 504. The LTE component may transmit the converted information on the resources for NR V2X transmission to the base station 504 at 528. The first base station 504 may determine if there are collisions between SPS resources for the LTE V2X transmission and the high priority resources for the NR V2X transmission, and may trigger reselection of the SPS resources for the LTE V2X transmission if there are collisions.

Figure 6:
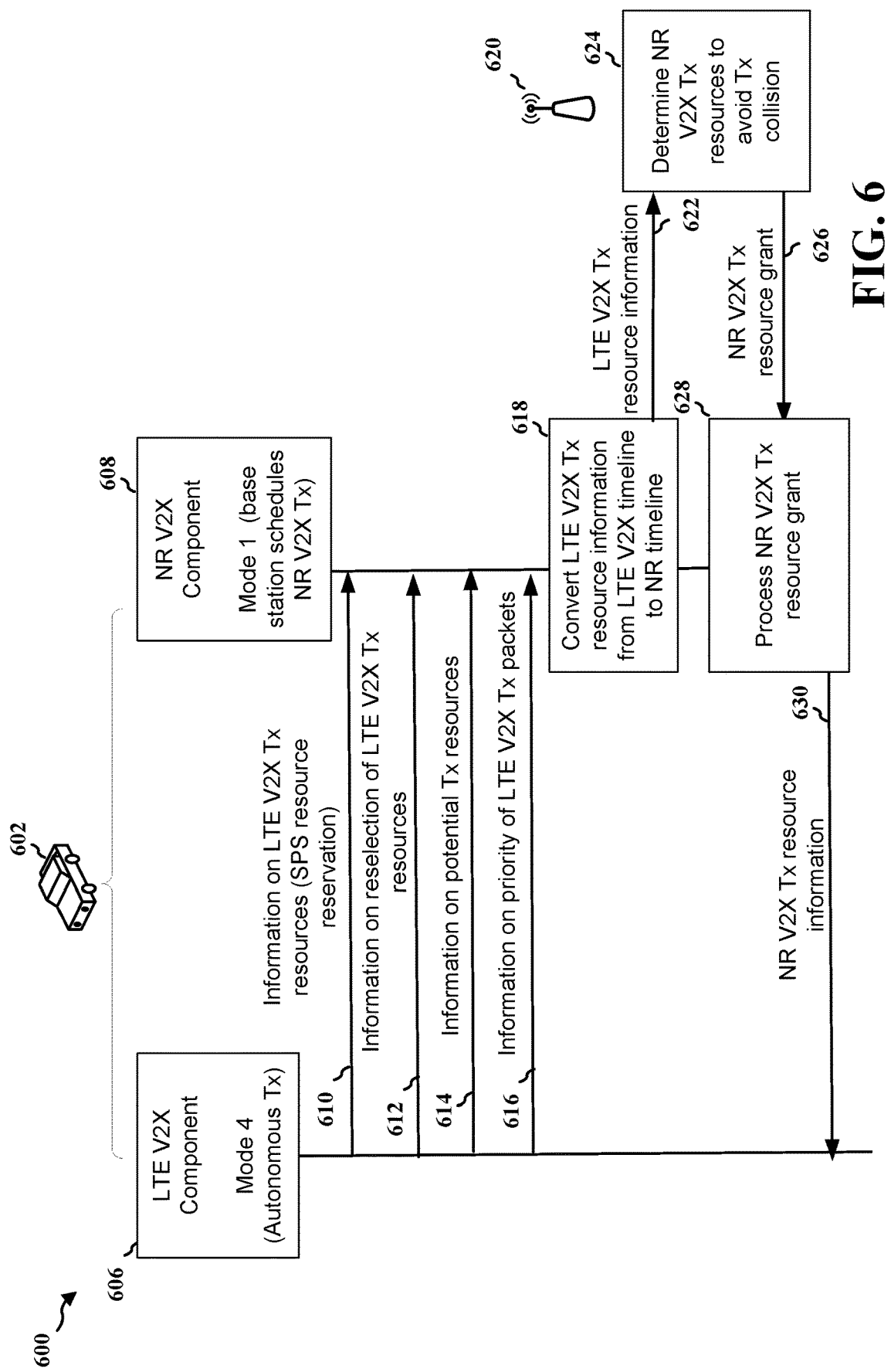
FIG. 6 is a call flow diagram illustrating an implementation of a NR component of a UE operating in the NR V2X mode in which an NR base station schedules NR V2X transmission exchanging information on transmission resources with a LTE component of the same UE operating in the LTE V2X autonomous transmission mode in accordance with certain aspects of the disclosure.

FIG. 6 is a call flow diagram 600 illustrating an implementation of a NR component 608 of a UE 602 operating in the NR V2X mode in which an NR base station 620 schedules NR V2X transmissions (e.g., NR mode 1) and exchanging information on transmission resources with a LTE component 606 of the same UE operating in the LTE V2X autonomous mode (e.g., LTE mode 4) in accordance with certain aspects of the disclosure. Although the example aspects are described in connection with LTE V2X communication and NR V2X communication, aspects may also be applied to V2X, V2V or D2D communication based on a first RAT and a second RAT.

An NR base station 620 (such as a gNB) may schedule transmission resources for NR V2X communication. The resources may be dynamic resources that are allocated on a one-time basis or may be SPS resources. The NR base station 620 may transmit a resource grant for the scheduled resources for NR V2X transmission to the NR component of the UE, e.g., at 626. In one aspect, the NR component may process the resource grant for the NR V2X transmission, e.g., at 628. The NR component may communicate information on the resources for NR V2X transmission to the LTE component at 630. While FIG. 6 illustrates 626, 628, and 630 occurring at the bottom of diagram 600, these steps may occur at the top of diagram 600 (e.g. before 610).

The LTE component 606 may reserve resources for LTE V2X transmission in an SPS manner. The LTE component may communicate information on the SPS resources for LTE V2X transmission to the NR component at 610. The LTE component may receive information on high priority resources reserved for NR V2X transmission (e.g., at 630) and, if there is a collision between the NR V2X transmission high priority resources and the scheduled LTE V2X transmission resources, the LTE component may trigger reselection of the LTE V2X transmission resources. The LTE component may communicate information on the reselected resources for LTE V2X transmission to the NR component at 612.

The LTE component 606 may communicate to the NR component 608 information on potential resources that may be selected by the LTE component for LTE V2X transmission at 614. The potential resources may not actually be selected for LTE V2X transmission, but the NR base station 620 may refrain from allocating these potential resources for NR V2X transmission to avoid collisions. In one aspect, the LTE component may communicate information on a priority of LTE V2X transmission packets to the NR component at 616.

The NR component 608 may process the information 610, 612 on the resources for LTE V2X transmission, the information 614 on potential resources selectable by the LTE component 606 for LTE V2X transmission, and the information 616 on priority of LTE V2X transmission packet at 608, and may forward some of the information on the LTE V2X transmissions to the NR base station 620. For example, the NR component may forward information on selected resources for LTE V2X transmission to the NR base station 620 for the NR base station 620 to adjust resources allocated for NR V2X transmission to avoid collisions at 624. In one aspect, the NR component may forward a certain percentage of the potential resources selectable by the LTE component for LTE V2X transmission to the NR base station 620 for the NR base station to avoid allocating these same resources for NR V2X transmission. In one aspect, the NR component may transmit the information on the LTE V2X transmission to the NR base station 620 periodically. In one aspect, the NR component may transmit the information if the change in the number of potential resources selectable by the LTE component for LTE V2X transmission exceeds a configurable threshold.

Because the NR base station 620 and the LTE component 606 may operate on asynchronous timelines, the information on the resources for LTE V2X transmission or the potential resources selectable by the LTE component for LTE V2X transmission may need to be converted from the LTE V2X timeline to the timeline of the NR base station 620. The NR component 608 may have knowledge of the LTE V2X timeline and may convert the information on the resources for LTE V2X transmission from the LTE V2X transmission timeline to the timeline of the NR base station 620 at 618. The NR component may transmit the converted information on the resources for LTE V2X transmissions to the NR base station 620 at 622. The NR base station 620 may avoid allocating the resources reserved for the LTE V2X transmissions for use by NR V2X transmissions to avoid collisions at 624. In one aspect, the NR base station 620 may allocate the same resources for NR V2X transmission if there are higher priority NR packets with lower latencies waiting for transmission.

Figure 7:
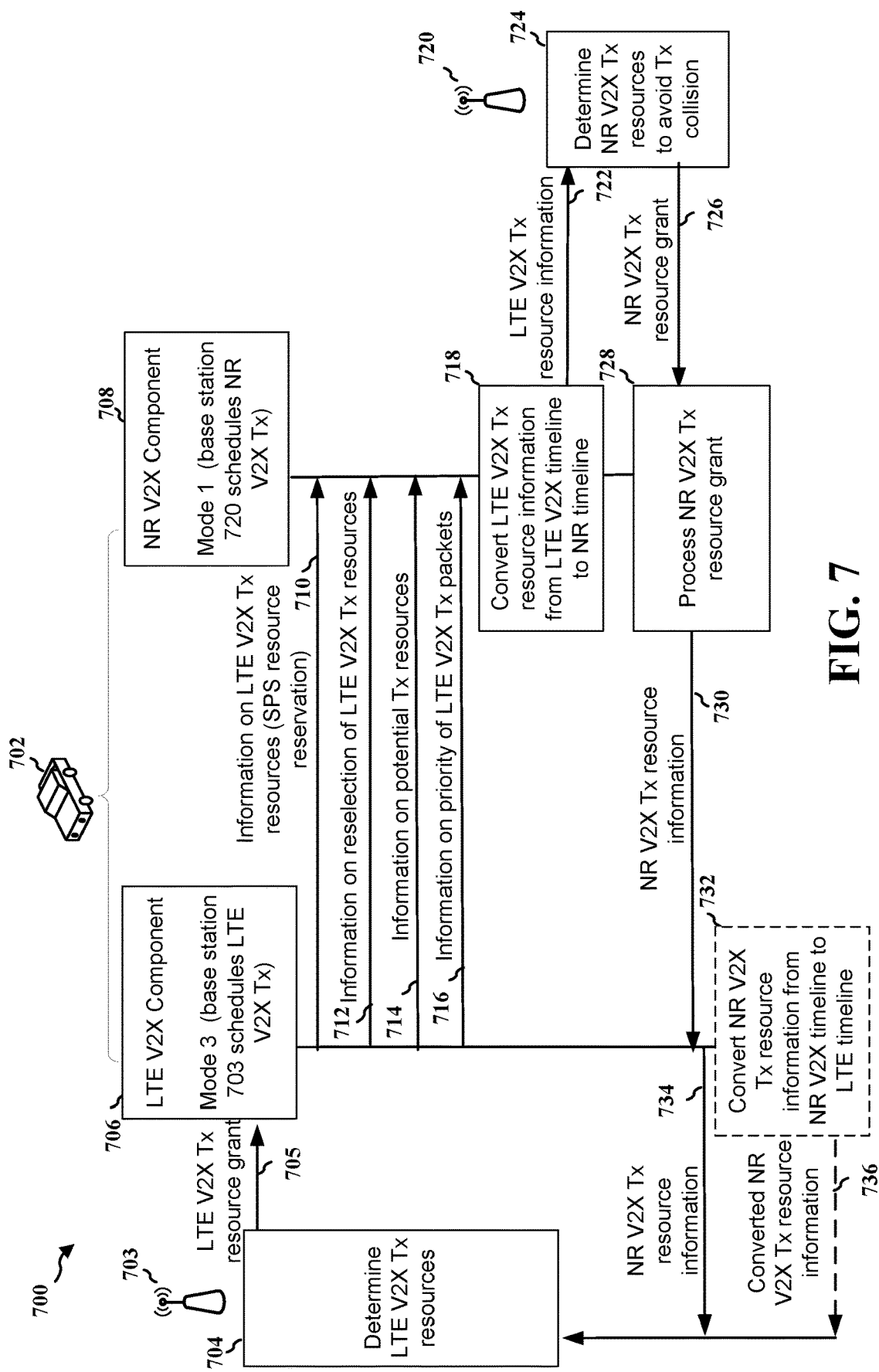
FIG. 7 is a call flow diagram illustrating an implementation of a NR component of a UE operating in the NR V2X mode in which an NR base station schedules NR V2X transmission exchanging information on transmission resources with a LTE component of the same UE operating in the LTE V2X mode in which an LTE base station schedules LTE V2X transmission in accordance with certain aspects of the disclosure.

FIG. 7 is a call flow diagram 700 illustrating an implementation of a NR component 708 of a UE 702 operating in the NR V2X mode in which an NR base station 720 schedules NR V2X transmissions (e.g., NR mode 1) and exchanging information on transmission resources with a LTE component 706 of the same UE operating in the LTE V2X mode in which an LTE base station 703 schedules LTE V2X transmissions (e.g., LTE mode 3) in accordance with certain aspects of the disclosure. Although the example aspects are described in connection with LTE V2X communication and NR V2X communication, aspects may also be applied to V2X, V2V or D2D communication based on a first RAT and a second RAT.

An NR base station 720 may schedule transmission resources (e.g. at 726) for NR V2X communication (e.g., processed at 728). The LTE component 706 may communicate information (e.g. 710, 712, 714, 716) on the resources for LTE V2X transmissions to the NR component 708. The NR component may process the information (for example, timeline conversion at 718) and may forward some of the information on the LTE V2X transmission to the NR base station 720 (e.g. at 722). The NR base station 720 may thus avoid allocating the resources reserved for the LTE V2X transmissions for use by NR V2X transmissions to avoid collisions at 724. The operations of the LTE component, the NR component, and the NR base station 720 are similar to those discussed in FIG. 6, and will not be repeated for brevity.

An LTE base station 703 may schedule transmission resources (e.g., at 704 and 705) for LTE V2X communication, as described above with respect to FIG. 5. The NR component 708 may communicate information on the resources for NR V2X transmission to the LTE component at 730. In one aspect, the LTE component 706 may forward the information on the resources for NR V2X transmission to the LTE base station 703 at 734. Alternatively, the LTE base station 703 and the NR base station 720 may operate on asynchronous timelines. As such, the information on the resources for NR V2X transmission may need to be converted from the timeline of the NR base station 720 to the timeline of the LTE base station 703. In one aspect, the NR component may perform the conversion if it has knowledge of the timeline of the LTE base station 703, and may communicate the converted timeline to the LTE component. In one aspect, the LTE component may perform the conversion at 732 if it has knowledge of the timeline of the NR base station 720. In one aspect, the LTE base station 703 may perform the conversion if it has knowledge of the timeline of the NR base station 720. After conversion, the LTE component may forward information about the timeline of the NR base station 720 to the LTE base station 703 at 736. The LTE base station 703 may determine if there are collisions (e.g., periodic collisions) between SPS resources for the LTE V2X transmission and high priority resources for the NR V2X transmission, and may reconfigure the SPS processes for the LTE V2X transmission if there are collisions.

Figure 8:
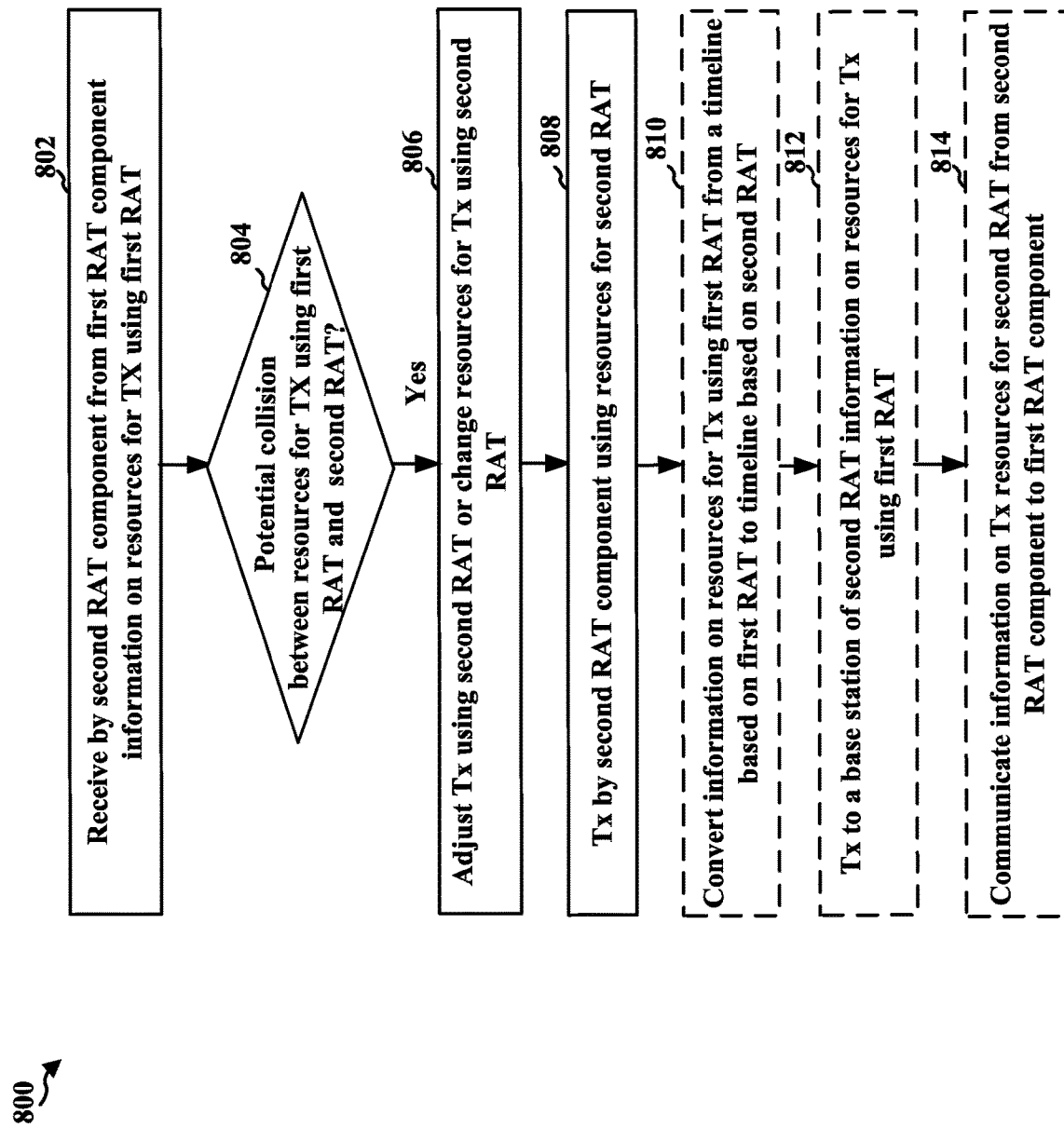
FIG. 8 is a flowchart of a method for a second RAT component of a UE to avoid collisions on transmission using the second RAT based on information on resources for transmission using the first RAT received from a first RAT component of the UE in accordance with certain aspects of the disclosure.

FIG. 8 is a flowchart of a method for a second RAT component of a UE to avoid collisions on V2X transmission using the second RAT based on information on resources for V2X transmission using the first RAT received from a first RAT component of the UE in accordance with certain aspects of the disclosure. The method may be performed by a NR component of a UE (e.g., UE 104, 350, 402, 502, 602, 702, 1350; the apparatus 1002, 1002'; the processing system 1114, which may include the memory 360 and which may be the entire UE 350 or a component of the UE 350, such as the TX processor 368, the RX processor 356, and/or the controller/processor 359). Optional aspects are illustrated with a dashed line. The method improves performance of V2X transmission using two RATs coexisting on the UE by allocating or adjusting transmission resources for the V2X transmission using the RAT with a lower priority to avoid potential collisions between V2X transmission using the two RATs. Although the example aspects are described in connection with LTE V2X communication and NR V2X communication, aspects may also be applied to V2X, V2V or D2D communication based on a first RAT and a second RAT.

At 802, the second RAT component of the UE may receive information on resources for V2X transmission using the first RAT from a first RAT component. In one aspect, the resources may be SPS resources for V2X transmission. In one aspect, the SPS resources for V2X transmission may be periodic. In one aspect, the resources may be resources scheduled on a one-time only basis (e.g., one-shot resources). In one aspect, the resources may be reselected SPS resources for V2X transmission determined by the first RAT component to avoid collisions between the V2X transmission using the first RAT and the second RAT. In one aspect, the resources may be potential or candidate resources that may be selected by the first RAT component for V2X transmission. The second RAT component of the UE may receive the information on the V2X transmission resources from the first RAT component using inter-stacks communication.

At 804, the second RAT component may determine if there is a potential collision between resources for V2X transmission using the first RAT and resources for V2X transmission using the second RAT. For example, the second RAT component may determine if there are one or more collisions between the SPS resources for the LTE V2X transmission using the first RAT and the resources for the NR V2X transmission using the second RAT.

At 806, if there is a potential collision between resources for V2X transmission using the first RAT and resources for V2X transmission using the second RAT, the second RAT component may adjust the resources for V2X transmission using the second RAT to avoid or reduce the potential collision. The second RAT component may adjust the resources for V2X transmission using the second RAT to give priority to the resources for V2X transmission using the first RAT. For example, if there are one or more collisions between the resources for the V2X transmission using the second RAT and the SPS resources for the V2X transmission using the first RAT, the second RAT component may reselect the resources for the V2X transmission using the second RAT.

At 808, the second RAT component may use the resources allocated for the V2X transmission using the second RAT to perform V2X transmission with a receiving UE. The resources may be one-shot resources or SPS resources used by the second RAT component to transmit one or more V2X transmission packets. In one aspect, the V2X transmission packets may have different levels of priority.

At 810, the second RAT component may convert information on resources for V2X transmission using the first RAT from a timeline based on the first RAT to a timeline based on a base station of the second RAT. The conversion may be performed by the base station of the second RAT if the base station schedules resources for V2X transmission using the second RAT. Because the base station of the second RAT and the first RAT component may operate on asynchronous timelines, in order for the base station of the second RAT to schedule resources for V2X transmission using the second RAT to avoid collisions with the V2X transmission using the first RAT, the information on resources for V2X transmission using the first RAT may need to be put into the timeline of the base station of the second RAT.

At 812, the second RAT component may transmit to the base station of the second RAT the information on resources for V2X transmission using the first RAT that has been converted into the timeline of the base station of the second RAT. The transmitted information may include information on the SPS processes for the V2X transmission using the first RAT, information on potential resources selectable by the first RAT component for V2X transmission using the first RAT, and information on priority of V2X transmission packets using the first RAT. In one aspect, the second RAT component may forward to the base station of the second RAT a certain percentage of the potential resources selectable by the first RAT component for V2X transmission using the first RAT. The base station of the second RAT may avoid allocating these same resources for the V2X transmission using the second RAT. In one aspect, the second RAT component may transmit the information on the resources for V2X transmission using the first RAT to the base station of the second RAT periodically. In one aspect, the second RAT component may transmit the information if the change in the number of potential resources selectable by the first RAT component for V2X transmission using the first RAT exceeds a configurable threshold.

At 814, the second RAT component may communicate to the first RAT component information on resources for V2X transmission using the second RAT. In one aspect, V2X transmission using the second RAT may be given priority over V2X transmission using the first RAT if packets in V2X transmission have high priority, tight delay requirement, or both. Thus, the resources for V2X transmission using the second RAT may be high priority resources. The first RAT component may receive the information on high priority resources for V2X transmission using the second RAT and may trigger reselection of the resources for V2X transmission using the first RAT if there are collisions between the SPS resources for V2X transmission using the first RAT and the high priority resources for V2X transmission using the second RAT.

Figure 9:
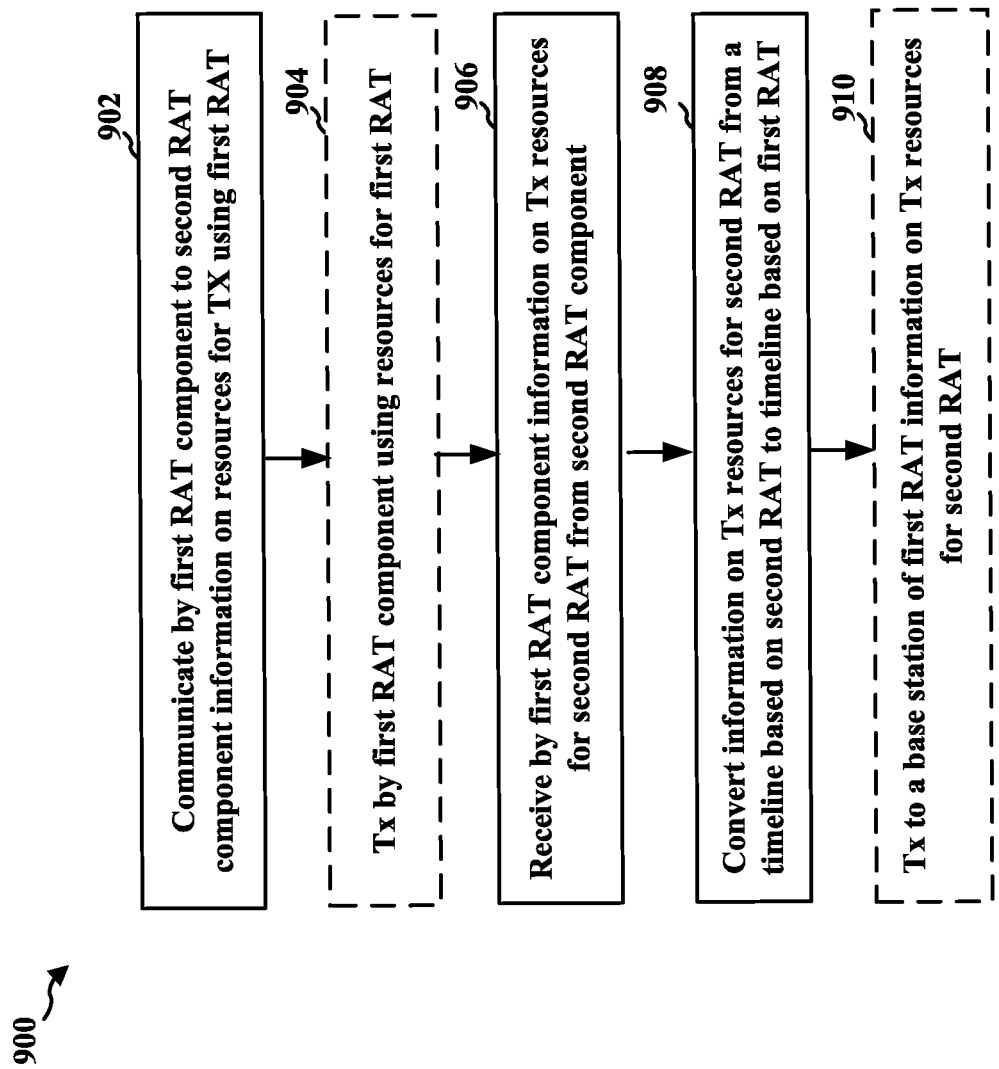
FIG. 9 is a flowchart of a method for a first RAT component of a UE to exchange information on transmission resources with a second RAT component of the UE and to transmit information on resources for transmission using the second RAT to a base station of the first RAT in accordance with certain aspects of the disclosure.

FIG. 9 is a flowchart 900 of a method for a first RAT component of a UE to exchange information on V2X transmission resources with a second RAT component of the UE and to transmit information on resources for V2X transmission using the second RAT to a base station of the first RAT in accordance with certain aspects of the disclosure. The method may be performed by a LTE component of a UE (e.g., UE 104, 350, 402, 502, 602, 702, 1350; the apparatus 1002, 1002'; the processing system 1114, which may include the memory 360 and which may be the entire UE 350 or a component of the UE 350, such as the TX processor 368, the RX processor 356, and/or the controller/processor 359). Optional aspects are illustrated in dashed lines. The method improves performance of V2X transmission using two RATs coexisting on the UE by allocating or adjusting transmission resources for the V2X transmission using the RAT with a lower priority to avoid potential collisions between V2X transmission using the two RATs. Although the example aspects are described in connection with LTE V2X communication and NR V2X communication, aspects may also be applied to V2X, V2V or D2D communication based on a first RAT and a second RAT.

At 902, the first RAT component of the UE communicates to a second RAT component of the UE information on resources for V2X transmission using the first RAT. In one aspect, the resources may be SPS resources for V2X transmission using the first RAT. In one aspect, the SPS resources for V2X transmission may be periodic. In one aspect, the resources may be resources scheduled on a one-time only basis (e.g., one-shot resources) using the first RAT. In one aspect, the resources may be reselected SPS resources for V2X transmission using the first RAT determined by the first RAT component to avoid collisions between the V2X transmission using the first RAT and using the second RAT. In one aspect, the resources may be potential or candidate resources that may be selected by the first RAT component for V2X transmission using the first RAT. The first RAT component of the UE may communicate the information on the V2X transmission resource using the first RAT to the second RAT component using inter-stacks communication.

At 904, the first RAT component may use the resources allocated for the V2X transmission using the first RAT to perform V2X transmission with a receiving UE. The resources may be SPS resources or a one-shot resource used by the first RAT component to transmit one or more V2X transmission packets. In one aspect, the V2X transmission packets may have different levels of priority.

At 906, the first RAT component may receive from the second RAT component information on resources for V2X transmission using the second RAT. In one aspect, V2X transmission using the second RAT may be given priority over V2X transmission using the first RAT if packets in V2X transmission have high priority, tight delay requirement, or both. Thus, the resources for V2X transmission using the second RAT may be high priority resources. The first RAT component may receive the information on high priority resources for V2X transmission using the second RAT and may trigger reselection of the SPS resources for V2X transmission using the first RAT if there are collisions between the SPS resources for V2X transmission using the first RAT and the high priority resources for V2X transmission using the second RAT.

At 908, the first RAT component may convert information on resources for V2X transmission using the second RAT from a timeline based on the second RAT to a timeline based on a base station of the first RAT. The conversion may be performed if the base station of the first RAT schedules resources for V2X transmission using the first RAT. Because the base station of the first RAT and the second RAT component may operate on asynchronous timelines, in order for the base station of the first RAT to schedule resources for V2X transmission using the first RAT to avoid collisions with the resources V2X transmission using the second RAT, the information on resources for V2X transmission using the second RAT may need to be put into the timeline of the base station of the first RAT. In one aspect, the resources for V2X transmission using the second RAT may be based on a timeline of the base station of the second RAT. The first RAT component may convert information on resources for V2X transmission using the second RAT from a timeline of the base station of the second RAT to a timeline of the base station of the first RAT.

At 910, the first RAT component may transmit to the base station of the first RAT information on resources for V2X transmission using the second RAT. In one aspect, the first RAT component may transmit the information on resources for V2X transmission using the second RAT that has been converted into the timeline of the base station of the first RAT. In one aspect, the first RAT component may perform the conversion if it has knowledge of the timeline of the second RAT component, such as at 908. In one aspect, the second RAT component may perform the conversion if it has knowledge of the timeline of the base station of the first RAT. In one aspect, the first RAT component may transmit the information on resources for V2X transmission using the second RAT that is still based on the timeline of the second RAT. The base station of the first RAT may convert the information on resources for V2X transmission using the second RAT from a timeline of the second RAT to a timeline of a base station of the first RAT if the base station of the first RAT has knowledge of the timeline of the second RAT. The base station of the first RAT may determine if there are collisions (e.g., one or more collisions) between SPS resources for the V2X transmission using the first RAT and high priority resources for the V2X transmission using the second RAT, and may reconfigure the SPS processes for the V2X transmission using the first RAT if there are collisions.

Figure 10:
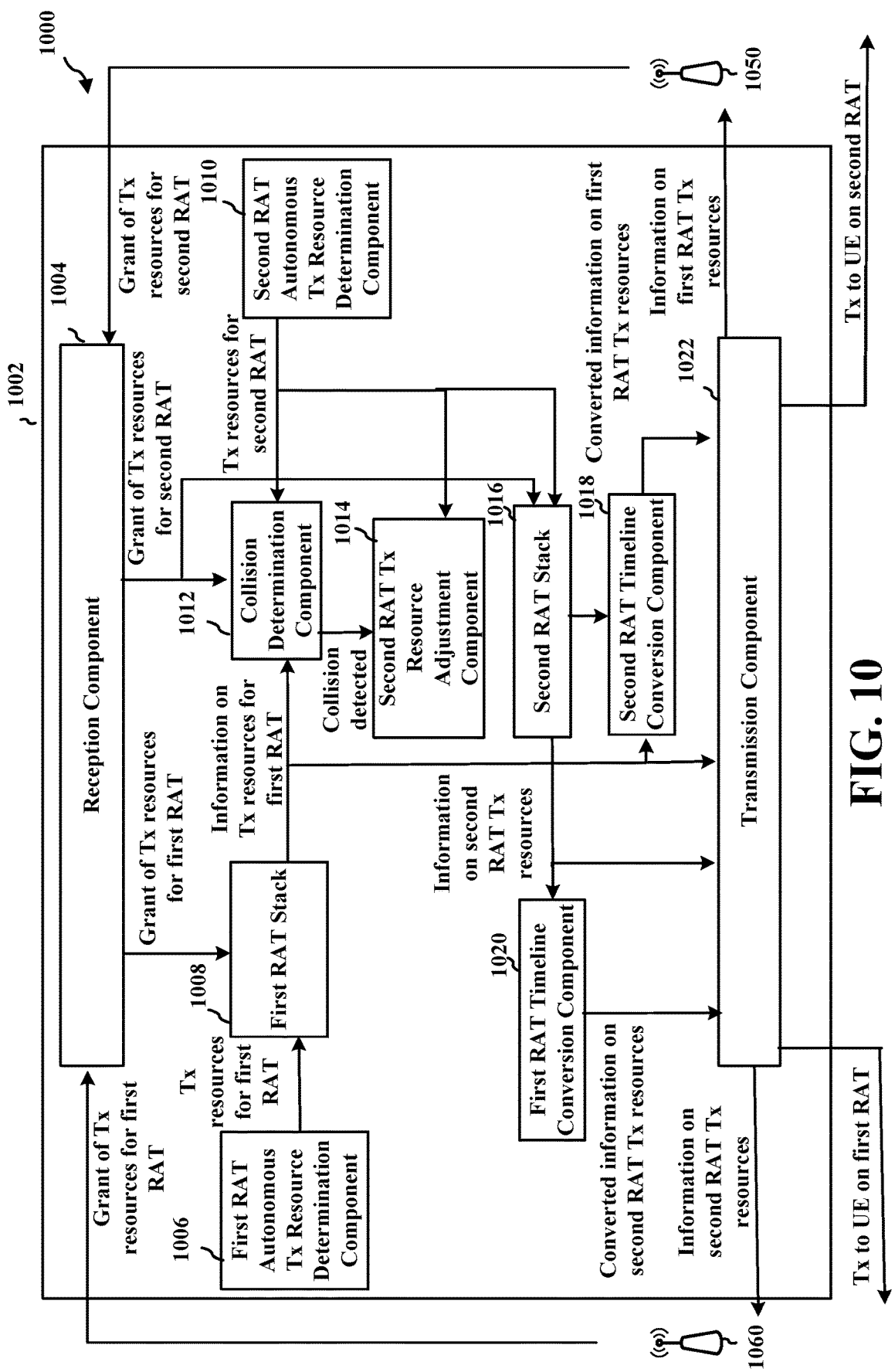
FIG. 10 is a conceptual data flow diagram illustrating the data flow between different means/components in an example apparatus of a UE that communicates using two RATs in accordance with certain aspects of the disclosure.

FIG. 10 is a conceptual data flow diagram 1000 illustrating the data flow between different means/components in an example apparatus 1002 in accordance with certain aspects of the disclosure. The apparatus 1002 may be a UE that communicates using two RATs (e.g., UE 104, 350, 402, 502, 602, 702, 1002', 1350). The apparatus includes a reception component 1004 that receives communication from a base station 1060 of a first RAT and a base station 1050 of a second RAT. The reception component 1004 may also receive V2X communications from a first UE using the first RAT and V2X communications from a second UE using the second RAT. The apparatus also includes a transmission component 1022 that transmits communications to the base station 1060 of a first RAT (e.g., as described in connection with 910) and the base station 1050 of a second RAT (e.g., as described in connection with 812). For example, the transmission component 1022 may transmit information on V2X transmissions using the second RAT to the base station 1060 of the first RAT and may transmit information on V2X transmissions using the first RAT to the base station 1050 of the second RAT. The transmission component 1022 may also transmit V2X communications to the first UE using the first RAT (e.g., as described in connection with 904) and V2X communications to the second UE using the second RAT (e.g., as described in connection with 808).

The apparatus 1002 includes components of the first RAT and components of the second RAT. The components of the first RAT includes first RAT autonomous transmission resource determination component 1006 configured to schedule resources for V2X transmission using the first RAT (e.g., as described in connection with 406, 506, 606, 706). The components of the first RAT includes first RAT stack 1008 configured to receive a grant of resources for V2X transmission using the first RAT from the base station 1060 of the first RAT. The first RAT stack 1008 may also receive resources for V2X transmission using the first RAT from the first RAT autonomous transmission resource determination component 1006. The first RAT stack 1008 may generate information on resources for V2X transmission using the first RAT and may communicate the information to components of the second RAT such as the collision determination component 1012 (e.g., as described in connection with 902). The components of the first RAT includes first RAT timeline conversion component 1020 configured to convert information on resources for V2X transmission using the second RAT from the timeline of the second RAT to the timeline of the first RAT (e.g., as described in connection with 908). The first RAT timeline conversion component 1020 may output the information on resources for V2X transmission using the second RAT based on the timeline of the base station 1060 of the first RAT.

The components of the second RAT includes second RAT autonomous transmission resource determination component 1010 configured to schedule resources for V2X transmission using the second RAT (e.g., as described in connection with 408, 508, 608, 708). The components of the second RAT include collision determination component 1012 configured to determine if there is a potential collision between resources for V2X transmission using the first RAT and the resources for V2X transmission using the second RAT (e.g., as described in connection with 804). Information on resources for V2X transmission using the first RAT may be received from the first RAT stack 1008. Information on resources for V2X transmission using the second RAT may be received from the base station 1050 of the second RAT via the grant of transmission resources for the second RAT or may be received from the second RAT autonomous transmission resource determination component 1010. The components of the second RAT include a second RAT transmission resource adjustment component 1014 configured to adjust transmission using the second RAT or to change resources for V2X transmission using the second RAT if a potential collision is detected by the collision determination component 1012 (e.g., as described in connection with 806).

The components of the second RAT include a second RAT stack 1016 configured to receive a grant of resources for V2X transmission using the second RAT from the base station 1050 of the second RAT. The second RAT stack 1016 may also receive resources for V2X transmission using the second RAT from the second RAT autonomous transmission resource determination component 1010. The second RAT stack 1016 may generate information on resources for V2X transmission using the second RAT and may communicate the information to components of the first RAT (e.g., as described in connection with 814). The components of the second RAT includes a second RAT timeline conversion component 1018 configured to convert information on resources for V2X transmission using the first RAT from the timeline of the first RAT to the timeline of the second RAT (e.g., as described in connection with 810). The second RAT timeline conversion component 1018 may output the information on resources for V2X transmission using the second RAT based on the timeline of the base station 1050 of the second RAT.

The apparatus 1002 may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
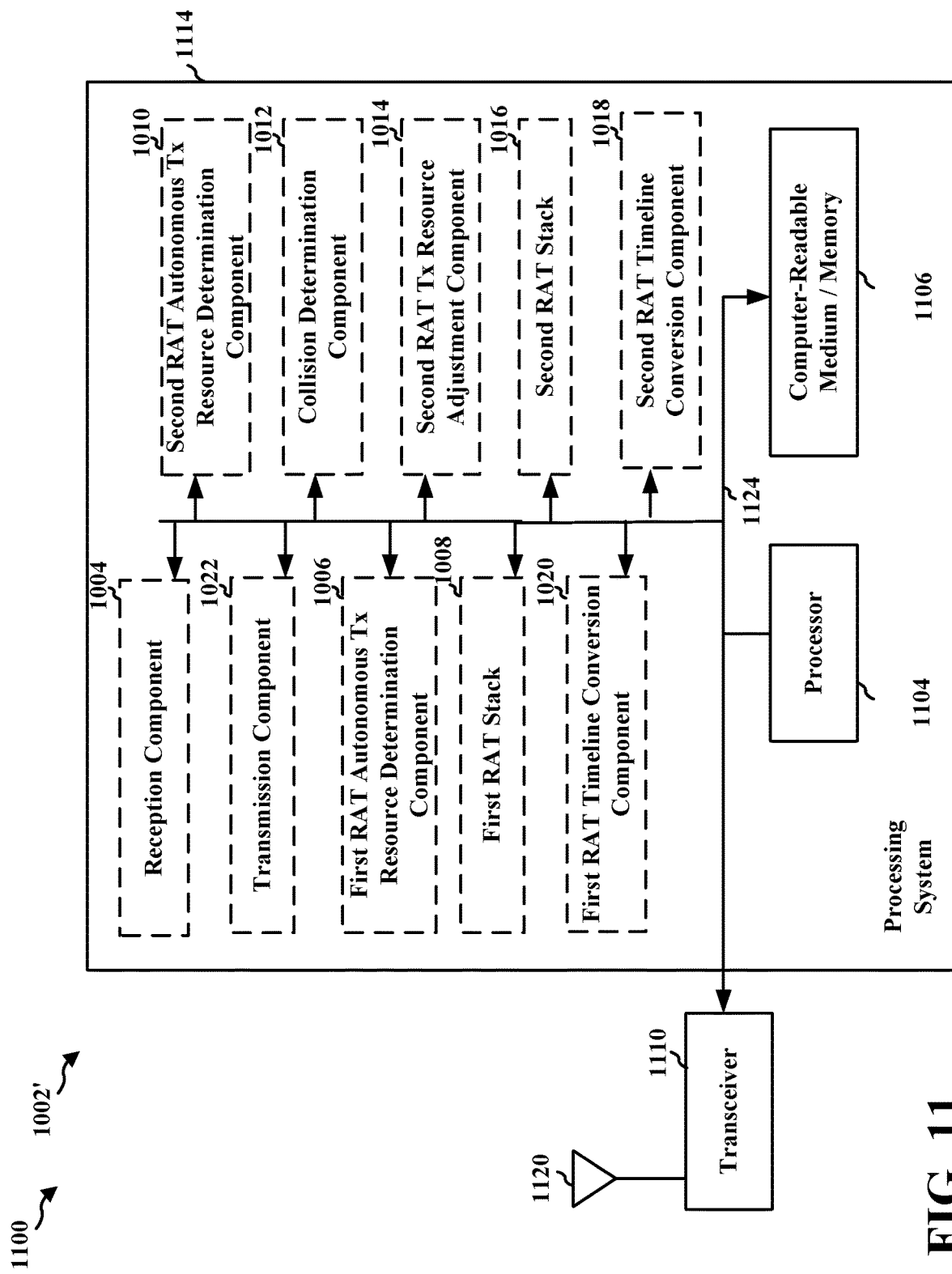
FIG. 11 is a diagram illustrating an example of a hardware implementation for an apparatus of a UE employing a processing system in accordance with certain aspects of the disclosure.

FIG. 11 is a diagram 1100 illustrating an example of a hardware implementation for an apparatus 1002' of a UE employing a processing system 1114 in accordance with certain aspects of the disclosure. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, 1022, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1022, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020, 1022. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving by the second RAT component from the first RAT component information on resources for V2X transmission using the first RAT (e.g., at least collision determination component 1012); means for determining if there is a potential collision between resources for V2X transmission using the first RAT and resources for V2X transmission using the second RAT (e.g., at least collision determination component 1012); means for adjusting transmission using the second RAT or changing resources for V2X transmission using the second RAT (e.g., at least second RAT transmission resource adjustment component 1014); means for transmitting V2X packets carried in resources for V2X transmission using the second RAT (e.g., at least transmission component 1022); means for converting information on resources for V2X transmission using the first RAT from a timeline of the first RAT to a timeline of the second RAT (e.g., at least second RAT timeline conversion component 1018); means for transmitting to a base station of the second RAT information on resources for V2X transmission using the first RAT (e.g., at least transmission component 1022); means for communicating information on V2X transmission resources using the second RAT from the second RAT component to the first RAT component (e.g., at least second RAT stack 1016).

In one configuration, the apparatus 1002' for wireless communication includes means for communicating information on resources for V2X transmission using the first RAT from the first RAT component to the second RAT component (e.g., at least first RAT stack 1008); means for transmitting V2X packets carried in resources for V2X transmission using the first RAT (e.g., at least transmission component 1022); means for receiving by the first RAT component from the second RAT component information on V2X transmission resources using the second RAT (e.g., at least first RAT timeline conversion component 1020); means for converting information on resources for V2X transmission using the second RAT from a timeline of the second RAT to a timeline of the first RAT (e.g., at least first RAT timeline conversion component 1020); means for transmitting to a base station of the first RAT information on resources for V2X transmission using the second RAT (e.g., at least transmission component 1022).

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
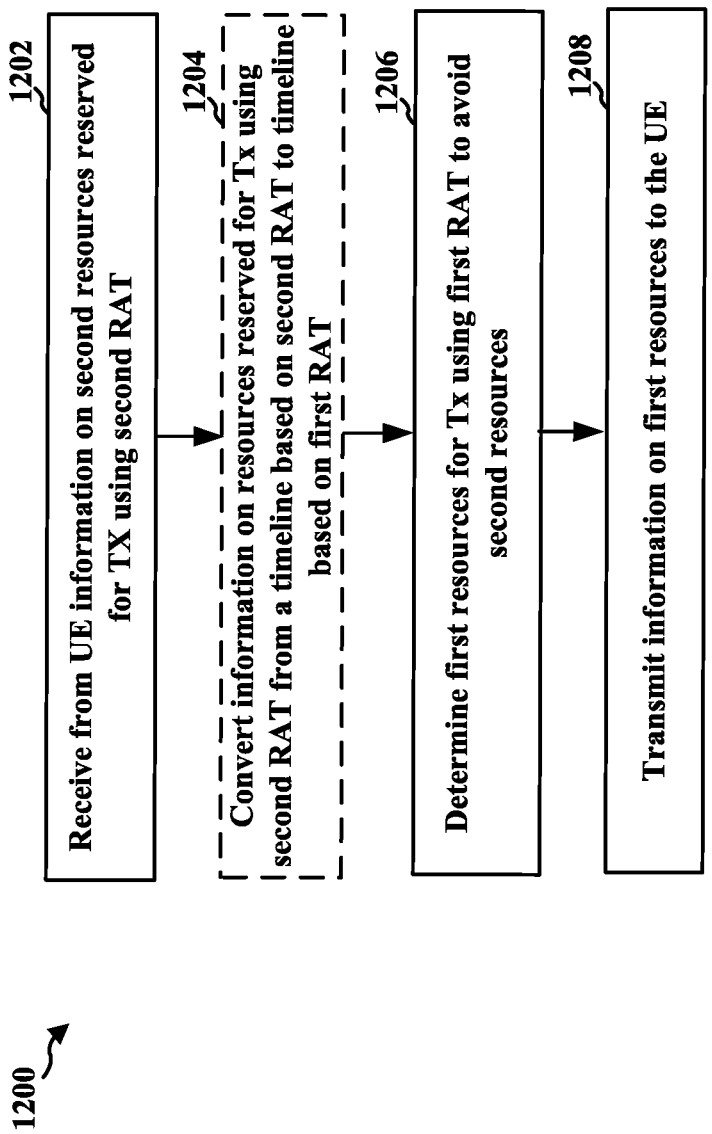
FIG. 12 is a flowchart of a method for a base station of a first RAT to receive from a UE information on resources reserved for a transmission from the UE using a second RAT to determine resources for a transmission from the UE using the first RAT in accordance with certain aspects of the disclosure.

FIG. 12 is a flowchart 1200 of a method for a base station of a first RAT to receive from a UE information on resources reserved for V2X transmission from the UE using a second RAT to determine resources for V2X transmission from the UE using the first RAT in accordance with certain aspects of the disclosure. The method may be performed by an LTE base station (e.g., eNB, base station 102, 310, 504, 703, 1060, the apparatus 1302/1302'; the processing system 1414, which may include the memory 376 and which may be the entire base station 310 or a component of the base station 310, such as the TX processor 316, the RX processor 370, and/or the controller/processor 375). Under this scenario, the first RAT may be LTE and the second RAT may be NR. Alternatively, the method may be performed by an NR base station (e.g., gNB, base station 102, 310, 620, 720, 1050, the apparatus 1302/1302'; the processing system 1414, which may include the memory 376 and which may be the entire base station 310 or a component of the base station 310, such as the TX processor 316, the RX processor 370, and/or the controller/processor 375). Under this scenario, the first RAT may be NR and the second RAT may be LTE. Optional aspects are illustrated with a dashed line. The method improves performance of V2X transmission using two RATs coexisting on the UE by allocating or adjusting transmission resources for the V2X transmission using the RAT with a lower priority to avoid potential collisions between V2X transmission using the two RATs. Although the example aspects are described in connection with LTE V2X communication and NR V2X communication, aspects may also be applied to V2X, V2V or D2D communication based on a first RAT and a second RAT.

At 1202, the base station of the first RAT may receive from the first RAT component of a UE information on second resources reserved for V2X transmission using the second RAT. In one aspect, the information may be information on resources for V2X transmission using the second RAT that has been converted into the timeline of the base station of the first RAT. In one aspect, the information may be information on resources for V2X transmission using the second RAT that is still based on the timeline of the second RAT.

At 1204, the base station of the first RAT may convert the information on second resources reserved for V2X transmission using the second RAT from the timeline of the second RAT to the timeline of the first RAT. For example, the base station of the first RAT may convert the information on resources for V2X transmission using the second RAT from a timeline of the second RAT to a timeline of a base station of the first RAT if the base station of the first RAT has knowledge of the timeline of the second RAT.

At 1206, the base station of the first RAT may determine the first resources for V2X transmission using the first RAT to avoid collisions with second resources reserved for V2X transmission using the second RAT. For example, the base station of the first RAT may determine if there are collisions (e.g., one or more collisions) between SPS resources for the V2X transmission using the first RAT and high priority resources for the V2X transmission using the second RAT, and may reconfigure the SPS processes for the V2X transmission using the first RAT if there are collisions.

At 1208, the base station of the first RAT may transmit information on first resources for V2X transmission using the first RAT to the first RAT component of the UE. For example, the base station of the first RAT may transmit resource grants for scheduled resources for V2X transmission to the first RAT component of the UE. The resources may be SPS resources or dynamic resources that are allocated on a one-time basis which are used by the first RAT component to transmit one or more V2X transmission packets. The first RAT component of the UE may use the resources allocated for the V2X transmission using the first RAT to perform V2X transmission with a receiving UE.

Figure 13:
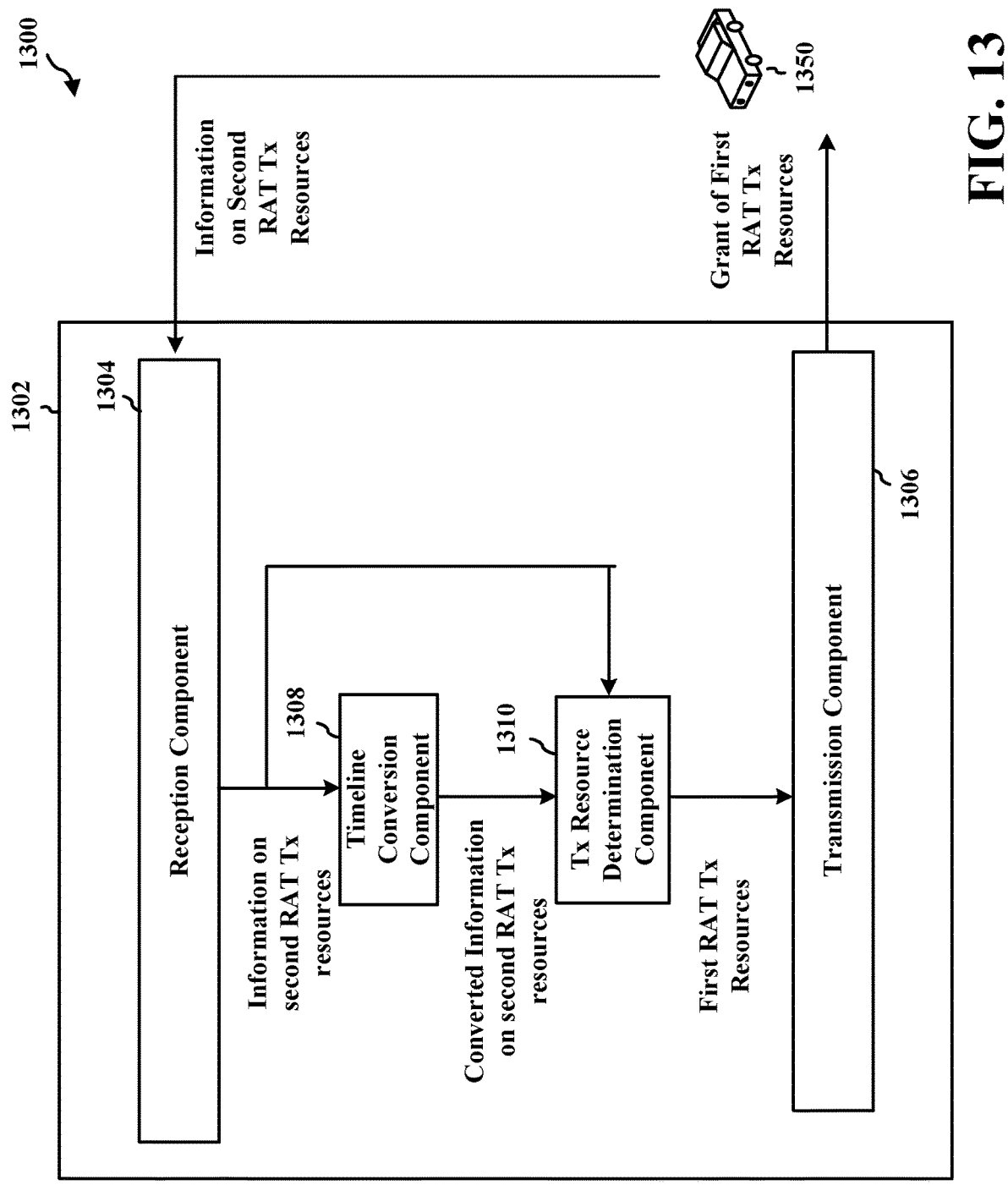
FIG. 13 is a conceptual data flow diagram illustrating the data flow between different means/components in an example apparatus of a base station in accordance with certain aspects of the disclosure.

FIG. 13 is a conceptual data flow diagram 1300 illustrating the data flow between different means/components in an example apparatus 1302 in accordance with certain aspects of the disclosure. The apparatus 1302 may be a base station of a first RAT such as an LTE base station (e.g., eNB, base station 102, 310, 504, 703, 1060, the apparatus 1302/1302'). Alternatively, the apparatus 1302 may be a base station such as an NR base station (e.g., gNB, base station 102, 310, 620, 720, 1050, the apparatus 1302/1302'). The apparatus includes a reception component 1304 that receives uplink communication from UE 1350 and a transmission component 1306 that transmits downlink communication to UE 1350. The reception component 1304 may be configured to receive information on resources for V2X transmission using the second RAT from the first RAT component of the UE 1350 (e.g., as described in connection with 1202). The transmission component 1306 may be configured to transmit a grant of resources for V2X transmission using the first RAT to the first RAT component of the UE 1350 (e.g., as described in connection with 1208). The first RAT component of the UE 1350 may use the resources granted for the V2X transmission using the first RAT to perform V2X with a receiving UE.

The apparatus 1302 may include a timeline conversion component 1308 configured to convert information on resources for V2X transmission using the second RAT from a timeline of the second RAT to a timeline of the first RAT (e.g., as described in connection with 1204). The timeline conversion component 1308 may output the information on resources for V2X transmission using the second RAT based on the timeline of the apparatus 1302. The apparatus 1302 includes a transmission resource determination component 1310 configured to determine or adjust resources for V2X transmission using the first RAT to avoid collisions with the resources for V2X transmission using the second RAT (e.g., as described in connection with 1206). The transmission resource determination component 1310 may generate the grant of resources for V2X transmission using the first RAT for transmission by the transmission component 1306 to the first RAT component of the UE 1350.

The apparatus 1302 may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
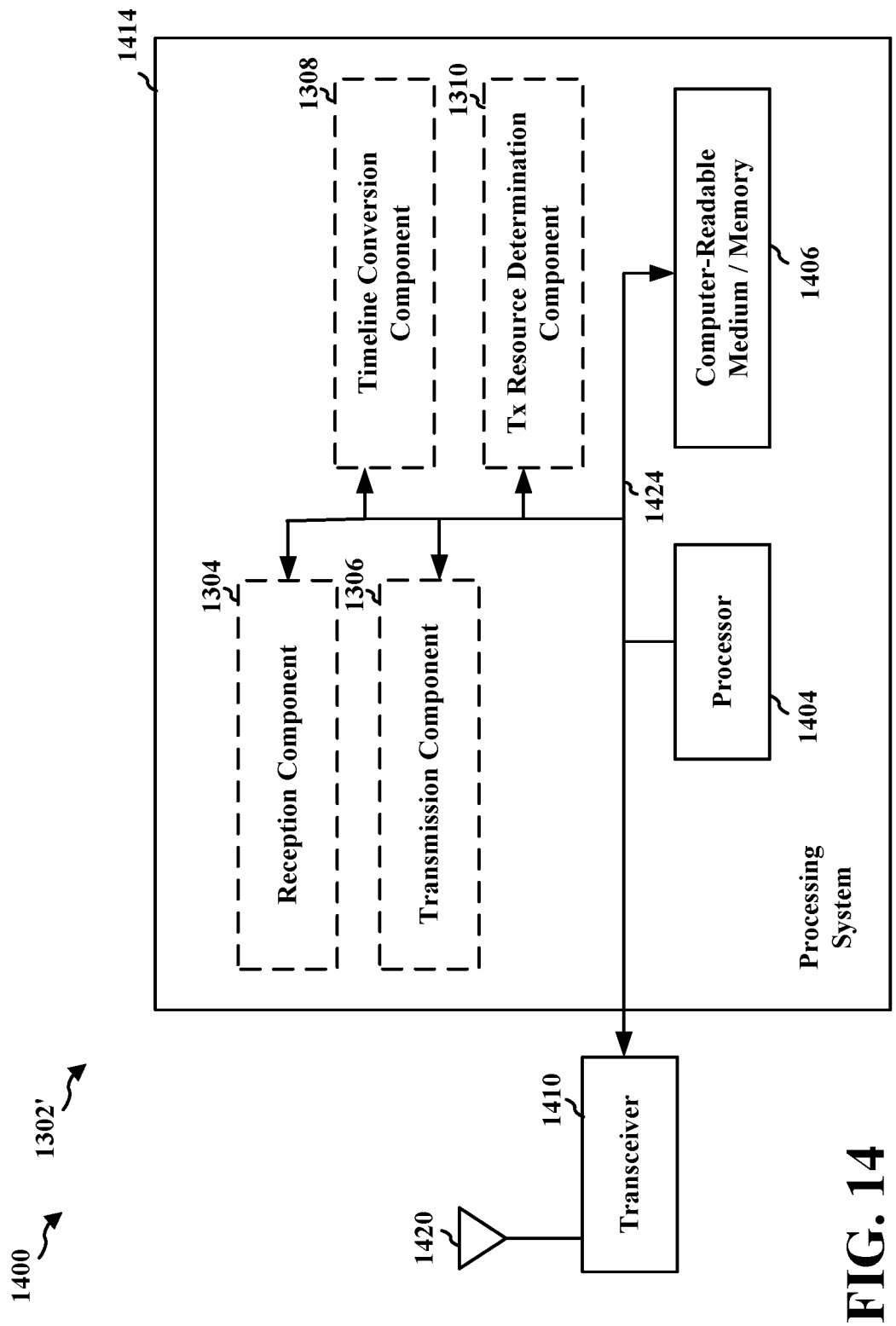
FIG. 14 is a diagram illustrating an example of a hardware implementation for an apparatus of a base station employing a processing system in accordance with certain aspects of the disclosure.

FIG. 14 is a diagram 1400 illustrating an example of a hardware implementation for an apparatus 1302' of a base station employing a processing system 1414 in accordance with certain aspects of the disclosure. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1104, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302' for wireless communication includes means for receiving from the first RAT component of a UE information on resources for V2X transmission using the second RAT (e.g., at least reception component 1304); means for converting information on resources for V2X transmission using the second RAT from a timeline of the second RAT to a timeline of the first RAT (e.g., at least timeline conversion component 1308); means for determining or adjusting resources for V2X transmission using the first RAT to avoid collisions with the resources for V2X transmission using the second RAT (e.g., at least transmission resource determination component 1310); means for transmitting grant of resources for V2X transmission using the first RAT to the first RAT component of the UE (e.g., at least transmission component 1306).

The aforementioned means may be one or more of the aforementioned components of the apparatus 1302 and/or the processing system 1414 of the apparatus 1302' configured to perform the functions recited by the aforementioned means. As described supra, the processing system 1414 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teaching described herein, without limitation.

Example 1 is a method of wireless communication at a UE having a first RAT component for communicating using the first RAT and a second RAT component for communicating using the second RAT, comprising: receiving, by the second RAT component of the UE from the first RAT component of the UE, information on first resources for a first transmission using the first RAT; determining, by the second RAT component, if there is a potential collision between the first resources for the first transmission using the first RAT and second resources for a second transmission using the second RAT; adjusting the second transmission or changing the second resources in response to determining the potential collision; and transmitting to a receiving UE at least one of the first transmission using the first RAT or the second transmission using the second RAT.

In Example 2, the method of Example 1 further includes that the information on the first resources comprises timing information for the first transmission using the first RAT.

In Example 3, the method of Example 1 or 2 further includes determining the potential collision comprises determining that a first timing of the first transmission using the first RAT overlaps at least partially in time with a second timing of the second transmission using the second RAT.

In Example 4, the method of any of Examples 1-3 further includes that the information on the first resources comprises a SPS reservation using the first RAT.

In Example 5, the method of any of Examples 1-4 further includes that the information on the first resources comprise a plurality of potential resources that are capable of being reserved for the first transmission using the first RAT.

In Example 6, the method of any of Examples 1-5 further includes the second RAT component changing the second resource in response to the potential collision by the second RAT component avoiding using the plurality of potential resources for the second resources for the second transmission using the second RAT.

In Example 7, the method of any of Examples 1-6 further includes receiving, by the first RAT component of the UE from a base station of the first RAT, the information on the first resources.

In Example 8, the method of any of Examples 1-7 further includes that the first RAT comprises LTE and the second RAT comprises NR.

In Example 9, the method of any of Examples 1-8 further includes transmitting, by the second RAT component of the UE to a base station of the second RAT, the information on at least a portion of the first resources for the first transmission using the first RAT.

In Example 10, the method of any of Examples 1-9 further includes that the UE transmits the information to the base station of the second RAT in response to a grant from the first RAT or a resource reselection by the first RAT component.

In Example 11, the method of any of Examples 1-10 further includes that the UE indicates a priority of the first transmission using the first RAT to the base station of the second RAT.

In Example 12, the method of any of Examples 1-11 further includes that the information on the first resources includes timing information for the first transmission over the first RAT, and wherein a first timing of the first transmission using the first RAT occurs with a pattern over a period of time.

In Example 13, the method of any of Examples 1-12 further includes that the information on the first resources comprise a plurality of potential resources that are capable of being reserved for the first transmission using the first RAT.

In Example 14, the method of any of Examples 1-13 further includes the second RAT component converting the information on the first resources for the first transmissions using the first RAT from a first timeline based on the first RAT to a second timeline based on the second RAT, wherein the second RAT component of the UE transmits the information on the first resources to the base station of the second RAT after converting the information to the second timeline based on the second RAT.

In Example 15, the method of any of Examples 1-14 further includes transmitting, by the second RAT component of the UE to the first RAT component of the UE, the information on third resources for a semi-persistent scheduling (SPS) reservation using the second RAT.

In Example 16, the method of any of Examples 1-15 further includes changing, by the first RAT component of the UE, the first resources in response to detecting an overlap in time between the first resources and the third resources.

In Example 17, the method of any of Example 1-16 further includes transmitting, by the first RAT component of the UE to a base station of the first RAT, the information on the third resources for the SPS reservation using the second RAT.

In Example 18, the method of any of Examples 1-17 further includes converting, by the first RAT component of the UE, the information on the third resources for the SPS reservation using the second RAT from a first timeline based on the second RAT to a second timeline based on the first RAT, wherein the first RAT component of the UE transmits the third resources for the SPS reservation to the base station of the first RAT after converting the third resources for the SPS reservation to the second timeline based on the first RAT.

In Example 19, the method of any of Examples 1-18 further includes converting, by the second RAT component of the UE, the information on the third resources for the SPS reservation using the second RAT from a first timeline based on the second RAT to a second timeline based on the first RAT, and wherein the first RAT component of the UE transmits the third resources for the SPS reservation to the base station of the first RAT after converting by the second RAT component of the UE the third resources for the SPS reservation to the second timeline based on the first RAT.

Example 20 is a device including one or more processors and one or more memories in electronic communication with the one or more processors storing instructions executable by the one or more processors to cause the system or apparatus to implement a method as in any of Examples 1-19.

Example 21 is a system or apparatus including means for implementing a method or realizing an apparatus as in any of Examples 1-19.

Example 22 is a non-transitory computer readable medium storing instructions executable by one or more processors to cause the one or more processors to implement a method as in any of Examples 1-19.

Example 23 is a method for wireless communication at a base station of a first RAT that schedules first resources for first transmission of a User Equipment (UE) using the first RAT, comprising: receiving, from the UE, information on second resources reserved for a second transmission from the UE to a receiving UE over a second RAT; determining the first resources for the first transmission using the first RAT to avoid the second resources reserved for the second transmission using the second RAT; and transmitting information about the first resources to the UE.

In Example 24, the method of Example 23 further includes that the information about the first resources comprises first timing information for the first transmission using the first RAT.

In Example 25, the method of Example 23 or 24 further includes that the information on the first resources comprises a SPS reservation using the first RAT.

In Example 26, the method of any of Examples 23-25 further includes that the information on the second resources comprise second timing information for the second transmission using the second R.

In Example 27, the method of any of Examples 23-26 further includes that the information on the second resources comprises a SPS reservation using the second RAT.

In Example 28, the method of any of Examples 23-27 further includes that the information on the second resources comprises a plurality of potential resources that are capable of being reserved for the second transmission over the second RAT.

In Example 29, the method of any of Examples 23-28 further includes converting the information on the second resources from a second RAT timeline based on the second RAT to a first RAT timeline based on the first RAT to avoid the second resources reserved for the second transmission using the second RAT.

Example 30 is a device including one or more processors and one or more memories in electronic communication with the one or more processors storing instructions executable by the one or more processors to cause the system or apparatus to implement a method as in any of Examples 23-29.

Example 31 is a system or apparatus including means for implementing a method or realizing an apparatus as in any of Examples 23-29.

Example 32 is a non-transitory computer readable medium storing instructions executable by one or more processors to cause the one or more processors to implement a method as in any of Examples 23-29.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE) having a first Radio Access Technology (RAT) component for communicating using a first RAT and a second RAT component for communicating using a second RAT, comprising:
receiving, by the second RAT component of the UE from the first RAT component of the UE, information on first resources for a first sidelink transmission using the first RAT;
converting the information on the first resources for the first sidelink transmission using the first RAT from a first timeline based on the first RAT to a second timeline based on the second RAT;
transmitting, by the second RAT component of the UE to a base station of the second RAT, at least a portion of the information on the first resources for the first sidelink transmission using the first RAT after converting the information to the second timeline based on the second RAT; and
transmitting to a receiving UE at least one of the first sidelink transmission using the first RAT or a second sidelink transmission using the second RAT.

2. The method of claim 1, wherein the first RAT comprises Long Term Evolution (LTE) and the second RAT comprises New Radio (NR).

3. The method of claim 1, wherein the information on the first resources comprises timing information for the first sidelink transmission using the first RAT.

4. The method of claim 3, wherein the information on the first resources comprises a semi-persistent scheduling (SPS) reservation using the first RAT.

5. The method of claim 1, wherein the information on the first resources comprises a plurality of potential resources that are capable of being reserved for the first sidelink transmission using the first RAT.

6. The method of claim 1, further comprising:
receiving, by the first RAT component of the UE from a base station of the first RAT, the information on the first resources.

7. The method of claim 1, wherein the UE transmits the information to the base station of the second RAT in response to a grant from the first RAT or a resource reselection by the first RAT component.

8. The method of claim 1, wherein the UE indicates a priority of the first sidelink transmission using the first RAT to the base station of the second RAT.

9. The method of claim 1, wherein the information on the first resources comprises timing information for the first sidelink transmission over the first RAT, and wherein a first timing of the first sidelink transmission using the first RAT occurs with a pattern over a period of time.

10. The method of claim 1, wherein the information on the first resources comprises a plurality of potential resources that are capable of being reserved for the first sidelink transmission using the first RAT.

11. The method of claim 1, further comprising:
transmitting, by the second RAT component of the UE to the first RAT component of the UE, the information on third resources for a semi-persistent scheduling (SPS) reservation using the second RAT.

12. The method of claim 11, further comprising:
changing, by the first RAT component of the UE, the first resources in response to detecting an overlap in time between the first resources and the third resources.

13. The method of claim 11, further comprising:
transmitting, by the first RAT component of the UE to a base station of the first RAT, the information on the third resources for the SPS reservation using the second RAT.

14. The method of claim 13, further comprising:
converting, by the first RAT component of the UE, the information on the third resources for the SPS reservation using the second RAT from the second timeline based on the second RAT to the first timeline based on the first RAT, and wherein the first RAT component of the UE transmits the third resources for the SPS reservation to the base station of the first RAT after converting the third resources for the SPS reservation to the first timeline based on the first RAT.

15. The method of claim 13, further comprising:
converting, by the second RAT component of the UE, the information on the third resources for the SPS reservation using the second RAT from the second timeline based on the second RAT to the first timeline based on the first RAT, and wherein the first RAT component of the UE transmits the third resources for the SPS reservation to the base station of the first RAT after converting by the second RAT component of the UE the third resources for the SPS reservation to the first timeline based on the first RAT.

16. The method of claim 1, further comprising:
determining, by the second RAT component, if there is a potential collision between the first resources for the first sidelink transmission using the first RAT and second resources for the second sidelink transmission using the second RAT; and
adjusting the second sidelink transmission or changing the second resources in response to determining the potential collision.

17. The method of claim 16, wherein determining the potential collision comprises determining that a first timing of the first sidelink transmission using the first RAT overlaps at least partially in time with a second timing of the second sidelink transmission using the second RAT.

18. The method of claim 16, wherein the information on the first resources comprises a plurality of potential resources that are capable of being reserved for the first sidelink transmission using the first RAT, and wherein changing the second resources in response to the potential collision comprises avoiding using, by the second RAT component of the UE, the plurality of potential resources for the second resources for the second sidelink transmission using the second RAT.

19. An apparatus for wireless communication at a User Equipment (UE) having a first Radio Access Technology (RAT) component for communicating using a first RAT and a second RAT component for communicating using a second RAT, comprising:
a memory; and
at least one processor coupled to the memory and configured to:
receive, by the second RAT component of the UE from the first RAT component of the UE, information on first resources for a first sidelink transmission using the first RAT;
convert the information on the first resources for the first sidelink transmission using the first RAT from a first timeline based on the first RAT to a second timeline based on the second RAT;
transmit, by the second RAT component of the UE to a base station of the second RAT, at least a portion of the information on the first resources for the first sidelink transmission using the first RAT after converting the information to the second timeline based on the second RAT;

transmit to a receiving UE at least one of the first sidelink transmission using the first RAT or a second sidelink transmission using the second RAT.

20. The apparatus of claim 19, wherein the at least one processor is further configured to:

transmit, by the second RAT component of the UE to the first RAT component of the UE, the information on third resources for a semi-persistent scheduling (SPS) reservation using the second RAT.

21. The apparatus of claim 19, wherein the at least one processor is further configured to:

determine, by the second RAT component, if there is a potential collision between the first resources for the first sidelink transmission using the first RAT and second resources for the second sidelink transmission using the second RAT; and adjust the second sidelink transmission or changing the second resources in response to determining the potential collision.

22. A method of wireless communication at a base station of a first Radio Access Technology (RAT) that schedules first resources for first sidelink transmission of a User Equipment (UE) using the first RAT, comprising:

receiving, from the UE, information on second resources reserved for a second sidelink transmission from the UE to a receiving UE over a second RAT and converted to a first timeline of the first RAT from a second timeline of the second RAT;

determining the first resources for the first sidelink transmission using the first RAT to avoid the second resources reserved for the second sidelink transmission using the second RAT; and transmitting resource information about the first resources to the UE.

23. The method of claim 22, wherein the resource information about the first resources comprises first timing information for the first sidelink transmission using the first RAT.

24. The method of claim 23, wherein the resource information about the first resources comprises a semi-persistent scheduling (SPS) reservation using the first RAT.

25. The method of claim 22, wherein the information on the second resources comprise second timing information for the second sidelink transmission using the second RAT.

26. The method of claim 25, wherein the information on the second resources comprises a semi-persistent scheduling (SPS) reservation using the second RAT.

27. The method of claim 22, wherein the information on the second resources comprises a plurality of potential resources that are capable of being reserved for the second sidelink transmission over the second RAT.

28. The method of claim 22, further comprising:

converting the information on the second resources from a second RAT timeline based on the second RAT to a first RAT timeline based on the first RAT to avoid the second resources reserved for the second sidelink transmission using the second RAT.

29. An apparatus for wireless communication at a base station of a first Radio Access Technology (RAT) that schedules first resources for first sidelink transmission of a User Equipment (UE) using the first RAT, comprising:

a memory; and at least one processor coupled to the memory and configured to:

receive, from the UE, information on second resources reserved for a second sidelink transmission from the UE to a receiving UE over a second RAT and converted to a first timeline of the first RAT from a second timeline of the second RAT;

determine the first resources for the first sidelink transmission using the first RAT to avoid the second resources reserved for the second sidelink transmission using the second RAT; and transmit information about the first resources to the UE.

* * * * *